US012769469B2

(12) United States Patent
Tatsumi et al.

(10) Patent No.: US 12,769,469 B2
(45) **Date of Patent: *Oct. 20, 2026**

(54) STORAGE SYSTEM AND STORAGE CONTROL METHOD OF PERFORMING GARBAGE COLLECTION ON ADDRESS THAT ARE NOT MAPPED IN SNAPSHOT FAMILY

(71) Applicant: Hitachi Vantara, Ltd., Kanagawa-ken (JP)

(72) Inventors: Ryosuke Tatsumi, Tokyo (JP); Tomohiro Yoshihara, Tokyo (JP); Takaki Matsushita, Tokyo (JP); Yusuke Yamaga, Tokyo (JP); Naoyuki Masuda, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/899,431

(22) Filed: Sep. 27, 2024

(65) Prior Publication Data

US 2025/0021252 A1 Jan. 16, 2025

Related U.S. Application Data

(63) Continuation of application No. 18/119,162, filed on Mar. 8, 2023, now Pat. No. 12,105,972.

(30) Foreign Application Priority Data

Nov. 24, 2022 (JP) ................................ 2022-187521

(51) Int. Cl.
*G06F 3/06* (2006.01)

(52) U.S. Cl.
CPC .......... *G06F 3/0638* (2013.01); *G06F 3/0611* (2013.01); *G06F 3/0641* (2013.01); *G06F 3/0679* (2013.01)

(58) Field of Classification Search
CPC .... G06F 3/0638; G06F 3/0611; G06F 3/0641; G06F 3/0679
See application file for complete search history.

(56) References Cited

U.S. PATENT DOCUMENTS

| | | | |
|---|---|---|---|
| 9,646,039 B2 | 5/2017 | Colgrove et al. | |
| 2012/0226672 A1 | 9/2012 | Hayashi et al. | |
| 2019/0108100 A1 | 4/2019 | Lyakas et al. | |
| 2022/0405200 A1* | 12/2022 | Karr | G06F 3/067 |

* cited by examiner

*Primary Examiner* — Chie Yew
(74) *Attorney, Agent, or Firm* — Procopio, Cory, Hargreaves & Savitch LLP

(57) ABSTRACT

A storage system includes a storage device and a processor. The storage device stores first mapping information and second mapping information. The first mapping information includes information indicating mapping, between an address of a respective volume (VOL) in a respective snapshot family and an address in a respective snapshot virtual device, in each of a plurality of snapshot families each including a primary volume (PVOL) and a secondary volume (SVOL) which is a snapshot of the PVOL. The second mapping information includes information indicating mapping between an address in the respective snapshot virtual device and an address in a deduplication virtual device.

10 Claims, 35 Drawing Sheets

FIG. 12

OWNERSHIP MANAGEMENT TABLE
1001

1201 1202

| VOL#/VDEV# | OWNER CPU # |
|---|---|
| 0x0000 | 0 |
| 0x00f0 | 1 |
| ... | ... |

FIG. 13

CR-VDEV MANAGEMENT TABLE
1002

1301 1302

| VDEV# | CR-VDEV# |
|---|---|
| 0x0000 | 0x0100 |
| 0x00f0 | 0x0f90 |
| ... | ... |

FIG. 14

Snapshot MANAGEMENT TABLE
1003

| PVOL# (1401) | SVOL# (1402) | ACQUISITION TIME (1403) |
|---|---|---|
| 0 | 0x010 | t0 |
| 0 | 0x020 | t1 |
| 0 | 0x030 | t2 |
| 0 | 0x040 | t3 |
| ... | ... | ... |

FIG. 15

VOL-Dir MANAGEMENT TABLE
1004

| | VOL# (1501) | Root-VOL# (1502) | Dir-Info# (1503) |
|---|---|---|---|
| PVOL# | 0x0000 | 0x0000 | 0x0000 |
| PVOL# | 0x0001 | 0x0001 | 0x0005 |
| PVOL# | ... | ... | ... |
| SVOL# | 0x0010 | 0x0000 | 0x0001 |
| SVOL# | 0x0020 | 0x0000 | 0x0002 |
| SVOL# | ... | ... | ... |

*FIG. 16*

LATEST GENERATION TABLE
1005

| LATEST GENERATION # |
| --- |
| 100 |

*FIG. 17*

RECOVERY MANAGEMENT TABLE
1006

| Dir-Info# (1701) | RECOVERY REQUEST (1702) |
| --- | --- |
| 0x0000 | 0 |
| 0x0001 | 1 |
| ... | ... |
| 0xFFFF | 0 |

GENERATION MANAGEMENT TREE TABLE
1007

1801 1802 1803 1804A 1804B

| Dir-Info# | GENERATION # | Prev | Next-A | Next-B |
|---|---|---|---|---|
| 0x0000 | 3 | 0x0001 | — | — |
| 0x0001 | 1 | 0x0003 | 0x0002 | 0x0000 |
| 0x0002 | 2 | 0x0001 | — | — |
| 0x0003 | 0 | — | 0x0001 | — |
| ... | ... | | | |
| 0xFFFF | — | | | |

Snapshot ALLOCATION MANAGEMENT TABLE
1008

1901 1902 1903 1904

| Block Address | Status | ALLOCATION DESTINATION VOL # | ALLOCATION DESTINATION Address |
|---|---|---|---|
| 0 | 1 | 0x0001 | 0 |
| 1 | 0 | n/a | n/a |
| 2 | 1 | 0x0010 | 100 |
| 3 | 0 | n/a | n/a |
| 4 | 1 | 0x0020 | 100 |
| ... | ... | ... | ... |

FIG. 20

Dir MANAGEMENT TABLE
1009

| VOL / VDEV ADDRESS (2001) | REFERENCE DESTINATION Mapping-Info # (2002) |
|---|---|
| 0x00000000 | 0 |
| 0x00000200 | 1 |
| 0x00000400 | 2 |
| ... | ... |

FIG. 21

SS-Mapping MANAGEMENT TABLE
1010

| Mapping-Info# (2101) | REFERENCE DESTINATION ADDRESS (2102) | REFERENCE DESTINATION SS-VDEV # (2103) | GENERATION # (2104) |
|---|---|---|---|
| 0 | 2 | 0x10 | 2 |
| 1 | 5 | 0x10 | 3 |
| 2 | 10 | 0x10 | 1 |
| ... | ... | ... | ... |

FIG. 22

COMPRESSION ALLOCATION MANAGEMENT TABLE
1011

| Sub-block Address (2201) | DATA LENGTH (2202) | Status (2203) | HEAD Sub-block Address (2204) | ALLOCATION DESTINATION VDEV # (2205) | ALLOCATION DESTINATION Address (2206) |
|---|---|---|---|---|---|
| 0 | 2 | 1 | 0 | 0x0010 | 0 |
| 1 | - | 1 | 0 | n/a | n/a |
| 2 | 1 | 2 | 2 | 0x010 | 100 |
| 3 | 1 | 1 | 3 | 0x010 | 100 |
| 4 | - | 0 | - | n/a | n/a |
| ... | ... | ... | ... | ... | ... |

FIG. 23

CR-Mapping MANAGEMENT TABLE
1012

| Mapping-Info# (2301) | REFERENCE DESTINATION Address (2302) | REFERENCE DESTINATION CR-VDEV # (2303) | DATA LENGTH (2304) |
|---|---|---|---|
| 0 | 2 | 0x1010 | 2 |
| 1 | 5 | 0x1010 | 3 |
| 2 | 10 | 0x1010 | 1 |
| ... | ... | ... | ... |

FIG. 24

Dedup-Dir MANAGEMENT TABLE
1013

| Dedup-VDEV Address (2401) | REFERENCE DESTINATION ALLOCATION INFORMATION # (2402) |
|---|---|
| 0 | 0 |
| 1 | 1 |
| ... | |

FIG. 25

Dedup ALLOCATION MANAGEMENT TABLE
1014

| ALLOCATION INFORMATION # (2501) | ALLOCATION DESTINATION SS-VDEV # (2502) | ALLOCATION DESTINATION Address (2503) | CONNECTION ALLOCATION INFORMATION # (2504) |
|---|---|---|---|
| 0 | 0x0010 | 0 | 2 |
| 1 | 0x0010 | 1 | 3 |
| 2 | 0x0020 | 100 | 14 |
| 3 | 0x0020 | 200 | - |
| ... | ... | ... | ... |

FIG. 26

Pool-Mapping MANAGEMENT TABLE
1015

2601 2602

| VDEV ADDRESS | Page# |
|---|---|
| 0x00000000 | 2 |
| 0x00000200 | 5 |
| 0x00000400 | 10 |
| ... | ... |

FIG. 27

Pool ALLOCATION MANAGEMENT TABLE
1016

2701 2702 2703 2704 2705 2706

| Page# | RG# | HEAD Address | Status | ALLOCATION DESTINATION VDEV # | ALLOCATION DESTINATION Address |
|---|---|---|---|---|---|
| 0 | 0 | 0 | 1 | 0x1010 | 0 |
| 1 | 0 | 100 | 0 | n/a | n/a |
| 2 | 0 | 200 | 1 | 0x1020 | 100 |
| 3 | 1 | 0 | 0 | n/a | n/a |
| 4 | 1 | 100 | 1 | 0x1010 | 100 |
| ... | ... | ... | ... | ... | ... |

STORAGE SYSTEM AND STORAGE CONTROL METHOD OF PERFORMING GARBAGE COLLECTION ON ADDRESS THAT ARE NOT MAPPED IN SNAPSHOT FAMILY

CROSS REFERENCE TO RELATED APPLICATIONS

This application is a continuation of U.S. patent application Ser. No. 18/119,162, filed on Mar. 8, 2023 which claims priority based on Japanese patent application No. 2022-187521, filed on Nov. 24, 2022, the entire contents of which are incorporated herein by reference.

BACKGROUND OF THE INVENTION

1. Field of the Invention

The present invention generally relates to storage control of a storage system.

2. Description of Related Art

As one of the functions of a storage system, a snapshot function is known. For the snapshot function, for example, a technology disclosed in U.S. Pat. No. 9,646,039B is known. U.S. Pat. No. 9,646,039B discloses a technology related to a snapshot function in conformity with Redirect-on-Write (RoW). The RoW scheme is a scheme of following and writing data. The following and writing is a data storage scheme of storing writing target data in a new region without overwriting data stored before writing and rewiring meta-information so that data stored in the new region is referred to when the data is written on a storage system.

For a snapshot acquired in the ROW scheme, the following data management can be adopted. That is, a virtual device is provided as a logical address space in a snapshot family which is a VOL group including a primary volume (PVOL) and a secondary volume (SVOL) which is a snapshot of the PVOL. An address of the same data in the virtual device is a reference destination of a plurality of different volumes (VOLs) in the snapshot family.

In such data management, a plurality of snapshot families can be configured. In this case, a virtual device is shared between the plurality of snapshot families. In separate snapshot family, a plurality of addresses of a plurality of VOLs in the snapshot family can serve as a reference source of the same address in the virtual device.

When data duplicated between the snapshot families is a storage target, the duplicated data is stored in a virtual device in a separate snapshot family.

To prevent the duplicated data from being stored in the virtual data, a de-duplication technique can be applied. When the de-duplication technique is applied, a plurality of addresses in a plurality of snapshot families can serve as a reference source of the same address in a virtual device.

In such data management to which the de-duplication technique is applied, when an address of data in a virtual device is changed due to a garbage collection or another reason and the address serves as reference destinations of a plurality of different addresses in a plurality of snapshot families, it is necessary to change a reference destination address for each of the plurality of addresses. Therefore, it takes time to change address mapping. Consequently, the entire time of processes involved in the change in the address mapping becomes long.

SUMMARY OF THE INVENTION

A storage system includes one or more snapshot virtual devices for each of a plurality of snapshot families. In addition, the storage system includes a deduplication virtual device as a virtual device different from the snapshot virtual device. Each snapshot virtual device is a logical address space serving as a storage destination of data of a VOL in the snapshot family corresponding to the snapshot virtual device.

When there is the same data in a plurality of VOLs of a snapshot family, the storage system maps a plurality of addresses of the same data in the plurality of VOLs to addresses of the snapshot virtual devices of the snapshot family. When there is duplicated data in two or more snapshot virtual devices of two or more snapshot families, the storage system maps two or more addresses of the duplicated data of the two or more snapshot virtual devices to addresses corresponding to the duplicated data in the deduplication virtual devices.

According to the invention, it is possible to change address mapping in a short time even when addresses are changed for duplicated data of a plurality of snapshot families.

BRIEF DESCRIPTION OF THE DRAWINGS

FIG. 12 is a diagram illustrating a configuration of an ownership management table;

FIG. 13 is a diagram illustrating a configuration of a CR-VDEV management table;

FIG. 14 is a diagram illustrating a configuration of a snapshot management table;

FIG. 15 is a diagram illustrating a configuration of a VOL-Dir management table;

FIG. 16 is a diagram illustrating a configuration of a latest generation table;

FIG. 17 is a diagram illustrating a configuration of a recovery management table;

FIG. 20 is a diagram illustrating a configuration of a Dir management table;

FIG. 21 is a diagram illustrating a configuration of an SS-Mapping management table;

FIG. 22 is a diagram illustrating a configuration of a compression allocation management table;

FIG. 23 is a diagram illustrating a configuration of a CR-mapping management table;

FIG. 24 is a diagram illustrating a configuration of a Dedup-Dir management table;

FIG. 25 is a diagram illustrating a configuration of a Dedup allocation management table;

FIG. 26 is a diagram illustrating a configuration of a pool-mapping management table;

FIG. 27 is a diagram illustrating a configuration of a pool allocation management table;

DESCRIPTION OF EMBODIMENTS

Figure 1:
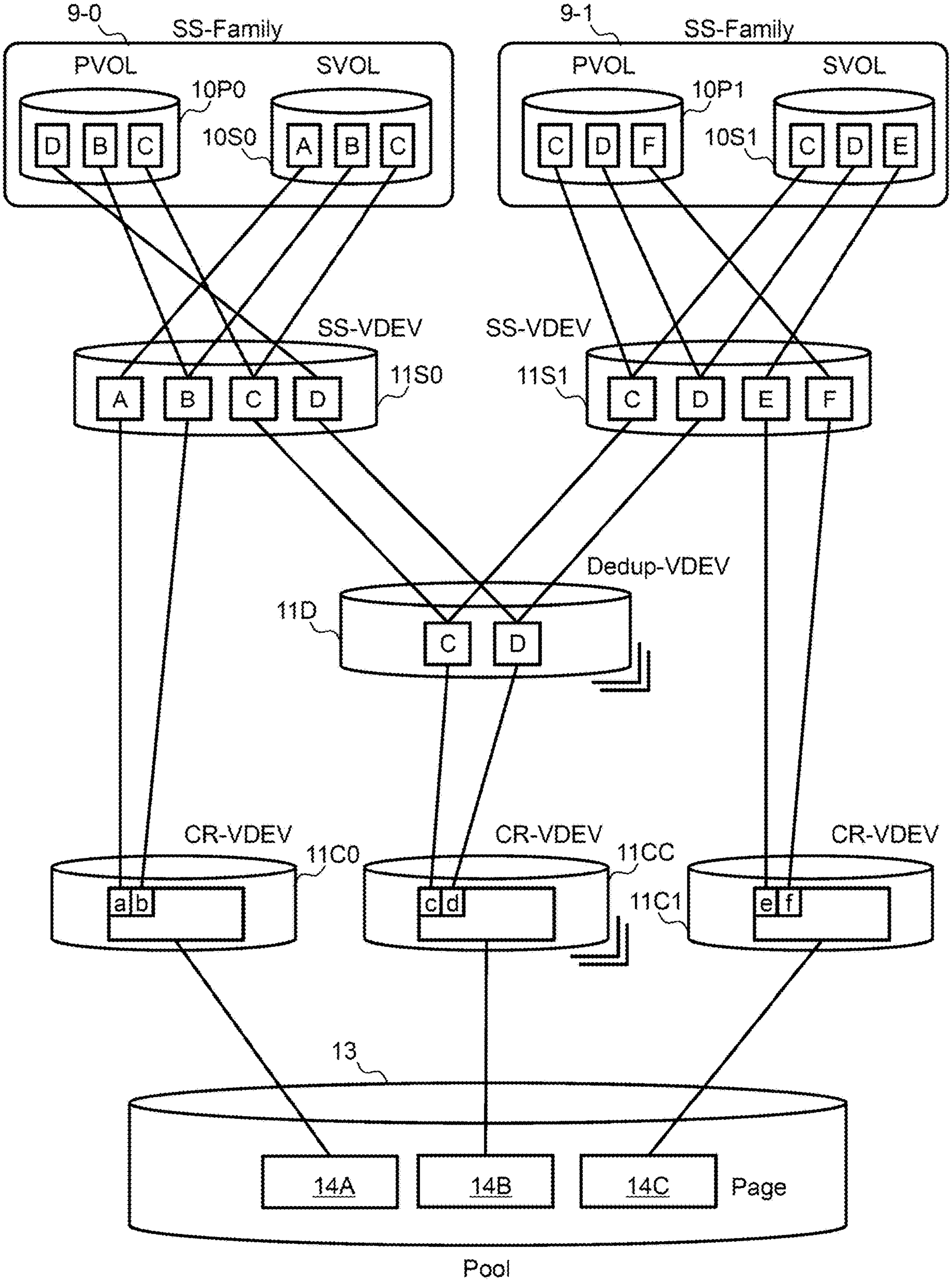
FIG. 1 is a diagram illustrating an overview of storage control of a storage system according to a first embodiment.

In the following description, an "interface device" may be one or more interface devices. The one or more interface devices may be at least one of the following interface devices.

- One or more input/output (I/O) interface devices. An input/output (I/O) interface device is an interface device for at least one of a remote display computer and an I/O device. The I/O interface device for the display computer may be a communication interface device. At least one I/O device may be one of user interface devices, for example, an input device such as a keyboard and a pointing device and an output device such as a display device.
- One or more communication interface devices. One or more communication interface devices may be the same type of one or more communication interface devices (for example, one or more network interface cards (NIC)) or may be different types of two or more communication interface devices (for example, an NIC and a host bus adapter (HBA)).

In the following description, a "memory" is one or more memory devices which are examples of one or more storage devices and may be typically main storage devices. At least one memory device in a memory may be a volatile memory device or a nonvolatile memory device.

In the following description, a "permanent storage device" may be one or more permanent storage devices which are examples of one or more storage devices. A permanent storage device may be typically a nonvolatile storage device (for example, an auxiliary storage device). Specifically, for example, a hard disk drive (HDD), a solid-state drive (SSD), a non-volatile memory express (NVME) drive, or a storage class memory (SCM) may be used.

In the following description, a "storage device" may be at least a memory and a memory of a permanent storage device.

In the following description, a "processor" may be one or more processor devices. At least one processor device may be typically a microprocessor device such as a central processing unit (CPU) or may another type processor device such as a graphics processing unit (GPU). At least one processor device may be single core or multi-cores. At least one processor device may be a processor core. At least one processor device may be a circuit which is a collection of gate arrays by a hardware description language executing some or all of processes (for example, a field-programmable gate array (FPGA) or a complex programmable logic device (CPLD)), or an extensive processor device such as an application specific integrated circuit (ASIC).

In the following description, in an expression such as "xxx table," information in which an output can be obtained with respect to an input is described in some cases, but the information may be data with any structures (for example, may be structured data or may be unstructured data) or may be a learning model typified by a neural network, a genetic algorithm, or a random forest generating an output with respect to an input. Accordingly, "xxx table" can be said to be "xxx information." In the following description, a configuration of each table is exemplary. One table may be divided into two or more tables, or some or all of two or more tables may be integrated as one table.

In the following description, a process in which a "program" is a subject will be described in some cases. However, the program is executed by a processor, so that a given process is executed appropriately using a storage device and/or an interface device. Therefore, a subject of the process may be considered to be a processor (alternatively, an apparatus or a system including the processor). The program may be installed in an apparatus such as a computer from a program source. The program source may be, for example, a recording medium (for example, a non-transitory recording medium) which can be read by a program distribution server or computer. In the following description, one or more programs may be implemented as one program, or one program may be implemented as two or more programs.

In the following description, "VOL" is an abbreviation for a logical volume and may be a logical storage region. A VOL is a realistic VOL (RVOL) or a virtual VOL (VVOL). An "RVOL" may be a VOL which is based on physical storage resources (for example, one or more RAID groups) which a storage system providing the RVOL have ("RAID" is an abbreviation for redundant array of independent (or inexpressive) disks). A "VVOL" may be any of an external connection VOL (EVOL), a capacity expansion VOL (TPVOL), and a snapshot VOL (SSVOL). An EVOL may be a VOL that is based on a storage space (for example, a VOL) of an external storage system and conforms with a storage virtualization technology. A TPVOL may be a VOL that includes a plurality of virtual regions (virtual storage regions) and conforms with a capacity virtualization technology (typically, a thin provisioning). An SSVOL may be a VOL that is provided as a snapshot of an original VOL. An SSVOL may be an RVOL. Typically, an SSVOL is placed as a secondary VOL when an original VOL serves as a primary VOL (PVOL). A "pool" is a logical storage region (for example, a set of a plurality of pool VOLs) and may be prepared for each use. For example, as a pool, at least one type of pool between a TP pool and a snapshot pool may be provided. A TP pool may be a storage region configured as a plurality of actual regions (realistic storage regions). When an actual region cannot be allocated to a virtual region (a virtual region of TPVOL) to which an address designated by a write request received from a host system belongs, a storage system allocates an actual region to the virtual region (a write destination virtual region) from the TP pool (even when another actual region is allocated to a write destination virtual region, an actual region may be newly allocated to the write destination virtual region). The storage system may write write target data incidental to the write request in an allocated actual region. The snapshot pool may be a storage region where data saved from the PVOL is stored. One pool may be used as a TP pool or a snapshot pool. A "pool VOL" may be a VOL which is a constituent of a pool. A pool VOL may be an RVOL or may be an EVOL.

A "storage system" may be a system that includes a controller executing I/O of data on a plurality of permanent storage devices (or a device including a plurality of permanent storage devices) or may be a system that includes one or more physical computers. In the latter system, for example, one or more physical computers may each execute predetermined software, so that the one or more physical computers may be configured as software-defined anything (SDx). As the SDx, for example, a software-defined storage (SDS) or a software-defined datacenter (SDDC) can be adopted.

In the following description, # (identification number) or an ID is adopted as an example of identification information of an element. The identification information may be information capable of identifying an element such as a name.

In the following description, when the same type of elements are not distinguished in description, a common number is used among reference numerals. When the same type of elements are distinguished in description, reference numerals used in some cases. In the following description, an element X of #n (where n is an identification number) is notated as "X #n."

In the following description, a snapshot is produced in a Row scheme. The ROW scheme may be one example of a data copyless scheme.

First Embodiment

FIG. 1 is a diagram illustrating an overview of storage control of a storage system according to a first embodiment. In FIG. 1, data notated in uppercase alphabetic letters (data A, B, C, . . . ) is block data and data notated in lowercase alphabetic letters (data a, b, c, . . . ) is sub-block data. The block data may be data in units of blocks. The block may be a logical storage region with a fixed length (logical address range). The sub-block data is compressed data of block data and a sub-block group (one or more sub-blocks) is data of a storage destination. The sub-block may be a logical storage region with a size less than a block. For example, an integer multiple of a sub-block may be a block.

A storage system that includes a storage device and a processor includes an SS-Family (snapshot family) 9, an SS-VDEV (snapshot device) virtual 11S, a Dedup-VDEV (deduplication virtual device) 11V, a CR-VDEV (compression postscript virtual device) 11C, and a pool 13.

The SS-Family 9 is a VOL group including a PVOL 10P and an SVOL 10S which is a snapshot of the PVOL 10P.

The SS-VDEV 11S is a virtual device serving as a logical address space and is considered as a storage destination of data in which one VOL 10 is a storage destination in the SS-Family 9.

A Dedup-VDEV 11D is a virtual device serving as a logical address space different from the SS-VDEV 11S and is considered as a storage destination of duplicated data of two or more SS-VDEVs 11S.

The CR-VDEV 11C is a virtual device serving as a logical address space different from the SS-VDEV 11S and the Dedup-VDEV 11D and is considered as a storage destination of compressed data.

Each of the plurality of CR-VDEVs 11C is associated with one of the SS-VDEV 11S and the Dedup-VDEV 11D and is not associated with both the SS-VDEV 11S and the Dedup-VDEV 11D. That is, each CR-VDEV 11C serves as a storage destination of data in which a VDEV (virtual device) corresponding to this CR-VDEV 11C is a storage destination and does not serve as a storage destination of data in which a VDEV not corresponding to this CR-VDEV 11C is a storage destination. For compressed data in which the CR-VDEV 11C is a storage destination, the pool 13 serves as a storage destination.

The pool 13 is a logical address space that is based on at least a part of a storage device (for example, a permanent storage device) included in the storage system. Instead of or in addition to at least the part of the storage device included in the storage system, the pool 13 may be based on at least a part of an external storage device (for example, a permanent storage device) of the storage system. The pool 13 includes a plurality of pages 14 which are a plurality of logical regions. Compressed data in which the CR-VDEV 11C is a storage destination is stored in the page 14 in the pool 13. Mapping between an address in the CR-VDEV 11C and an address in the pool 13 is 1:1. The pool 13 is configured from one or more pool VOLs.

In the example illustrated in FIG. 1, the following storage control is executed.

The processor produces an SVOL 1080 as a snapshot of a PVOL 10P0, and thus an SS-Family 9-0 in which the PVOL 10P0 is set as a root VOL can be generated. The processor produces an SVOL 10S1 as a snapshot of a PVOL 10P1, and thus an SS-Family 9-1 in which the PVOL 10P1 is set as a root VOL can be generated. Referring to FIG. 1, as examples of the plurality of SS-Families, there are SS-Families 9-0 and 9-1.

The storage system includes one or more SS-VDEVs 11S for each of the plurality of SS-Families 9. In each SS-Family 9, for data in which one VOL 10 in the SS-Family 9 is a storage destination, the SS-VDEV 11S corresponding to the SS-Family 9 is considered as a storage destination among the plurality of SS-VDEVs 11S. The SS-Family 9-0 is taken as an example specifically as follows, for example.

The processor sets an SS-VDEV 11S0 as a storage destination for data A in which the SVOL 10S0 of the SS-Family 9-0 is a storage destination. The processor maps an address corresponding to the data A in the SVOL 10S0 to an address corresponding to the data A in the SS-VDEV 11S corresponding to the SS-Family 9-0.

When there is the same data B in the plurality of VOLs (the PVOL 10P0 and the SVOL 10S0) of the SS-Family 9-0, the processor maps a plurality of addresses (an address in the PVOL 10P0 and an address in the SVOL 10S0) of the same data B among the plurality of VOLs 10 to an address of the SS-VDEV 11S0 of the SS-Family 9-0 (an address corresponding to the data B).

In the SS-Families 9-0 and 9-1 (examples of two or more SS-Families 9), a storage destination of deduplicated data is considered as the CR-VDEV 11C corresponding to the SS-Family 9 and a storage destination of duplicated data is considered as the Dedup-VDEV 11D.

That is, since data C is duplicated in the SS-VDEVs 11S0 and 11S1 of the SS-Families 9-0 and 9-1 (examples of two or more SS-VDEVs 11S), the processor maps two address of the duplicated data C in the SS-VDEVs 11S0 and 11S1 to an address corresponding to the duplicated data C in the Dedup-VDEV 11D. The processor compresses the duplicated data C and sets a storage destination of compressed data c to a CR-VDEV 11CC corresponding to the Dedup-VDEV 11D. That is, the processor maps an address (block address) of the duplicated data C in the Dedup-VDEV 11D to an address (sub-block address) of the compressed data c in the CR-VDEV 11CC. The processor allocates a page 14B to the CR-VDEV 11CC and stores the compressed data c in the page 14B. The address of the compressed data c in the CR-VDEV 11CC is mapped to an address in the page 14B of the pool 13.

On the other hand, since the data A in the SS-VDEV 11S0 is deduplicated with the data in the other SS-VDEV 11S1, the processor compresses the deduplicated data A and sets compressed data a in a CR-VDEV 11C0 corresponding to the SS-VDEV 11S0. That is, the processor maps an address (block address) of the deduplicated data A in the SS-VDEV 11S0 to an address (sub-block address) of the compressed data a in the CR-VDEV 11C0. The processor allocates a page 14A to the CR-VDEV 11C0 and stores the compressed data a in the page 14A. The address of the compressed data a in the CR-VDEV 11C0 is mapped to an address in the page 14A of the pool 13.

The CR-VDEV 11C is postscript VDEV. Therefore, the processor updates the address mapping when the CR-VDEV 11C corresponding to the SS-VDEV 11S is considered as a storage destination of updated data and when the CR-VDEV 11C corresponding to the Dedup-VDEV 11D is considered as a storage destination of the updated data. Specifically, the processor executes, for example, the following storage control.

When a storage target in the CR-VDEV 11C0 is updated data a' of the compressed data a, the processor sets a storage destination of the updated data a' to a vacant address in the CR-VDEV 11C0 and invalidates the address of the compressed data a before the update. The processor maps an address in the SS-VDEV 11S0 which is the address mapped to the address of the compressed data a to a storage destination address of the updated data a' in the CR-VDEV 11C0 instead of the address of the compressed data a in the CR-VDEV 11C0. The processor maps an address in the page 14A which is the address mapped to the address of the compressed data a to a storage destination address of the updated data a' in the CR-VDEV 11C0 instead of the address of the compressed data a in the CR-VDEV 11C0.

When a storage target in the CR-VDEV 11CC is updated data c' of the compressed data c, the processor sets a storage destination of the updated data c' to a vacant address in the CR-VDEV 11CC and invalidates an address of the compressed data c before the update. The processor maps an address in the Dedup-VDEV 11D which is the address mapped to the address of the compressed data c to a storage destination address of the updated data c' in the CR-VDEV 11CC instead of the address of the compressed data c in the CR-VDEV 11CC. The processor maps an address in the page 14B which is the address mapped to the address of the compressed data c to a storage destination address of the updated data c' in the CR-VDEV 11CC instead of the address of the compressed data a in the CR-VDEV 11CC.

The CR-VDEV 11C is the above-described postscript VDEV and executes garbage collection. That is, the processor can cause valid addresses (addresses of latest data) to be continuous and can cause addresses of vacant regions to be continuous by executing garbage collection of the CR-VDEV 11C.

In the example illustrated in FIG. 1, apart from the SS-VDEV 11S considered as a storage destination of data in the SS-Family 9, the Dedup-VDEV 11D considered as a storage destination of duplicated data in two or more SS-Families 9 is prepared. Accordingly, even when an address of the duplicated data C in the Dedup-VDEV 11D is changed, the address mapping of a change target is completed as two mappings (mapping to two addresses in the SS-VDEVs 11S0 and 11S1). On the other hand, in a comparative example, a storage destination of data in the SS-Family 9 and a storage destination of duplicated data in the two or more SS-Families 9 are the same VDEV. In this case, the address mappings of the change target for the duplicated data C are four mappings (mappings to four addresses in the VOLs 10P0, 10S0, 10P1, and 10S1). In the embodiment, a change in the address mapping in a shorter time than in the comparative example is expected.

Apart from the Dedup-VDEV 11D, the CR-VDEV 11CC is prepared for the Dedup-VDEV 11D. Accordingly, even when an address of the compressed data c in the CR-VDEV 11CC is changed, address mapping of a change target is completed as one mapping (mapping to one address in the Dedup-VDEV 11D). On the other hand, in a comparative example, a storage destination of compressed data in the SS-Family 9 and storage destinations compressed data of duplicated data in two or more SS-Families 9 are the same VDEV. In this case, address mappings of a change target for the compressed data c of the duplicated data C are four mappings (mappings to four addresses in the VOLs 10P0, 10S0, 10P1, and 10S1). In the embodiment, a change in the address mapping in a shorter time than in the comparative example is expected.

An address of the compressed data c is changed in garbage collection of the CR-VDEV 11CC corresponding to the Dedup-VDEV 11D. For example, the processor changes an address of the updated data c' (updated data of the compressed data c) in the CR-VDEV 11CC in the garbage collection of the CR-VDEV 11CC and maps an address in the Dedup-VDEV 11D which is an address mapped to an address before the change to an address after the change in the CR-VDEV 11CC. Since a change in the address mapping for the compressed data of the duplicated data in a short time is expected, execution of garbage collection in a short time is expected. The garbage collection of the CR-VDEV 11C corresponding to the SS-VDEV 11S includes, for example, the following process. That is, the processor changes the address of the updated data a' (the updated data of the compressed data a) in the CR-VDEV 11C0 and maps an address in the SS-VDEV 11S0 which is the address mapped to the address before the change to an address after the change in the CR-VDEV 11C0.

For at least one CR-VDEV 11C, a postscript VDEV in which uncompressed data is stored may be adopted instead of the CR-VDEV 11C. In the embodiment, however, the CR-VDEV 11C is adopted as a postscript VDEV. Therefore, data finally stored in a storage device is compressed data, and thus a storage capacity to be assumed can be reduced.

Figure 2:
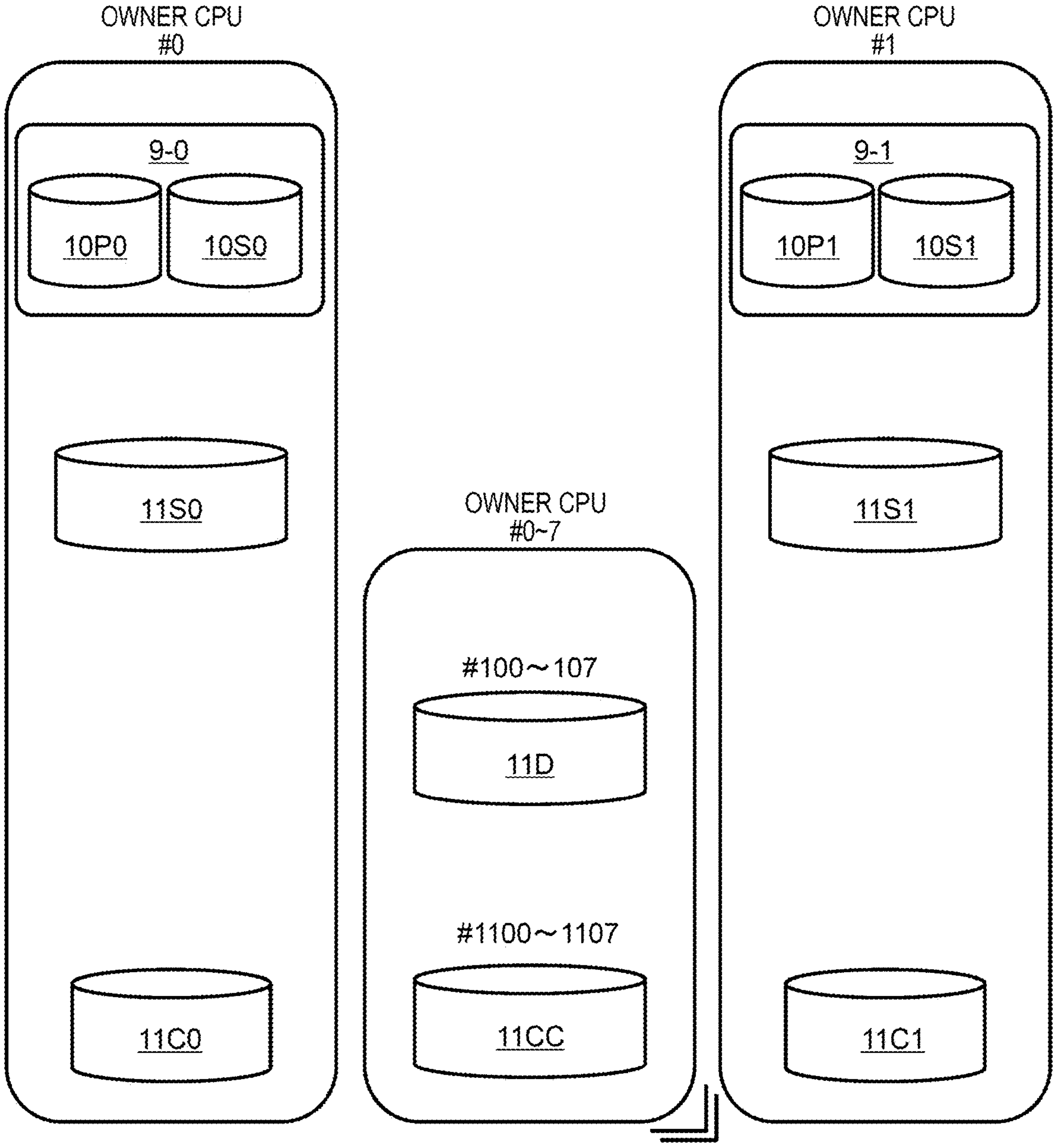
FIG. 2 is a diagram illustrating examples of ranges of owner CPUs.

FIG. 2 is a diagram illustrating examples of ranges of owner CPUs.

The processor is a plurality of CPUs which are examples of a plurality of processor devices. By limiting an exclusive ownership (access right (I/O right)) of data or control information for the VOL 10 to a specific CPU, a processing time taken for an exclusive process in an I/O process or a communication time between the CPUs is reduced. Therefore, an improvement in performance is expected.

When an owner CPU (an identification number of the CPU that has an authority) is associated with the VOL 10 or the VDEV 11 and the CPU corresponds to the owner CPU, each of the plurality of CPUs executes updating of information regarding I/O for the VOL 10 or the VDEV 11 or address mapping for the VOL 10 or the VDEV 11. In other words, when the CPU does not correspond to the owner CPU, communication between the CPUs is required to update the information regarding I/O or address mapping.

In the embodiment, an owner CPU of the SS-Family 9 (specifically, each of all the VOLs 10 in the SS-Family 9), an owner CPU of the SS-VDEV 11S with respect to the SS-Family 9, an owner CPU of the CR-VDEV 11C corresponding to the SS-VDEV 11S are the same CPU. Accordingly, for deduplicated data, communication between the CPUs for transferring a process to the CPU that has an ownership in order to change address mapping or I/O can be unnecessary, and thus an improvement in performance of a process including a change in the address mapping in a short time is expected. For example, for the deduplicated data A (see FIG. 1) in the SS-Family 9-0, only CPU #0 among the plurality of CPUs executes changing of address mapping and I/O. Similarly, for deduplicated data F (see FIG. 1) in the SS-Family 9-1, only CPU #1 among the plurality of CPUs executes changing of address mapping and I/O.

In the embodiment, the owner CPU of the Dedup-VDEV 11D and the owner CPU of the CR-VDEV 11C corresponding to the Dedup-VDEV 11D are the same CPU. Accordingly, duplicated data is related to the Dedup-VDEV 11D and the CR-VDEV 11C corresponding to the Dedup-VDEV 11D and communication between the CPUs for transferring a process to the CPU that has an ownership in order to change address mapping or I/O is unnecessary. For example, an owner CPU of Dedup-VDEV #10*x* (where x is an integer of 0 to 7) and the CR-VDEV #110*x* of Dedup-VDEV #10*x* are assumed to be CPU #x. When a storage destination of the duplicated data C and D (see FIG. 1) is Dedup-VDEV #100, communication between the CPUs for changing address mapping or I/O is unnecessary for the duplicated data C. However, the duplicated data D is related to Dedup-VDEV #100 and CR-VDEV #1100 of the Dedup-VDEV #100 and communication from CPU #0 to CPU #1 is necessary.

Hereinafter, the embodiment will be described in detail.

Figure 3:
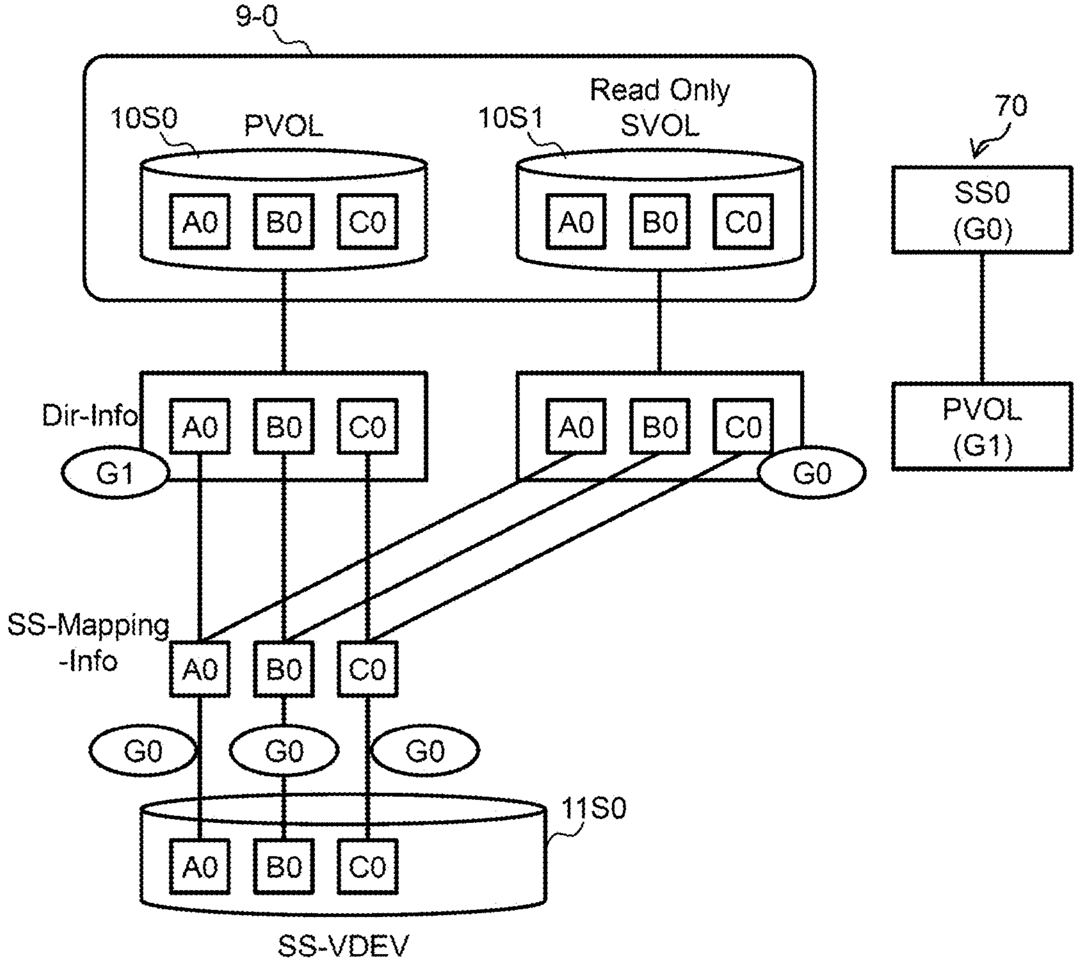
FIG. 3 is a diagram illustrating an overview of mapping management between addresses in an SS-Family and addresses in SS-VDEV.

FIG. 3 is a diagram illustrating an overview of mapping management between addresses in the SS-Family 9 and addresses in SS-VDEV 11S. In the drawing, "GX" (where X is an integer of 0 or more) means generation X. FIG. 3 illustrates the SS-Family 9-0 and the SS-VDEV 11S0 as an example.

The processor can manage mapping between addresses in the VOL 10 in the SS-Family 9-0 and addresses in the SS-VDEV 11S0 by using meta-information. The meta-information includes directory information (Dir-Info) and snapshot mapping information (SS-Mapping-Info). The processor manages data of the PVOL 10P0 and the SVOL 10S0 by associating the Dir-Info with the SS-Mapping-Info. For data in which the VOL 10 is considered as a storage destination, the Dir-Info includes information indicating an address of a reference source (an address in the VOL 10), and the SS-Mapping-Info corresponding to the data includes information indicating an address of the reference source (an address in the SS-VDEV 11S0).

Further, the processor manages a time series of the PVOL 10P0 and the SVOL 10S0 by generation information associated with the Dir-Info and manages each piece of data in which the SS-VDEV 11S0 is a storage destination by associating generation information indicating a generation produced by the data with the SS-Mapping-Info. Besides, the processor manages latest generation information at that time as a latest generation.

In a stage before acquisition of a snapshot, it is assumed that there are pieces of data A0, B0, and C0 in which the PVOL 10P0 is considered as a storage destination.

The Dir-Info associated with the PVOL 10P0 is associated with "0" as generation # (which is a number indicating a generation) and includes reference information indicating reference destinations of all the pieces of data A0, B0, and C0 of the PVOL 10P0. Thereafter, when generation # associated with the Dir-Info is "X," the Dir-Info can be notated as a generation X.

The SS-VDEV 11S0 is considered as the storage destinations of the pieces of data A0, B0, and C0 and the SS-Mapping-Info is associated with each of the pieces of data A0, B0, and C0. Each piece of SS-Mapping-Info is associated with "0" as generation #. When generation # associated with the SS-Mapping-Info indicates "X," data corresponding to the SS-Mapping-Info can be notated as data of the generation X.

In a state before the acquisition of the snapshot, for each of the pieces of data A0, B0, and C0, information in the Dir-Info refers to the SS-Mapping-Info corresponding to the data. By associating the Dir-Info with the SS-Mapping-Info in this way, it is possible to cause the PVOL 10P0 to be associated with the SS-VDEV 11S0 and implement data processing on the PVOL 10P0.

In order to acquire the snapshot, the processor sets duplication of the Dir-Info to the Dir-Info of the read-only SVOL 10S0. The processor increases the generation of the Dir-Info of the PVOL 10P0 and also increases the latest generation. As a result, for each of the pieces of data A0, B0, and C0, the SS-Mapping-Info is referred to from both Dir-Info of generation 0 and the Dir-Info of generation 1.

In this way, it is possible to produce a snapshot by duplicating the Dir-Info and it is possible to produce a snapshot without increasing data on the SS-VDEV 11S0 or the SS-Mapping-Info.

Here, when the snapshot is acquired, writing is prohibited at the time of acquisition, and the snapshot (SVOL 10S0) in which data is fixed becomes generation 0 and the PVOL 10P0 in which data can be written even after the acquisition becomes generation 1. Generation 0 is "first old generation in a lineage" with respect to generation 1 and is referred to as a "parent" for convenience. Similarly, generation 1 is "first new generation in a lineage" with respect to generation 0 and is referred to as a "child" for convenience. The storage system manages a parent-child relationship of the generation as Dir-info generation management tree 70. Generation # of the Dir-Info is the same as generation # of the VOL 10 corresponding to the Dir-Info. Generation # of the SS-Mapping-Info is oldest generation # among one or more pieces of generation # of Dir-Info in which the SS-Mapping-Info is referred to.

Figure 4:
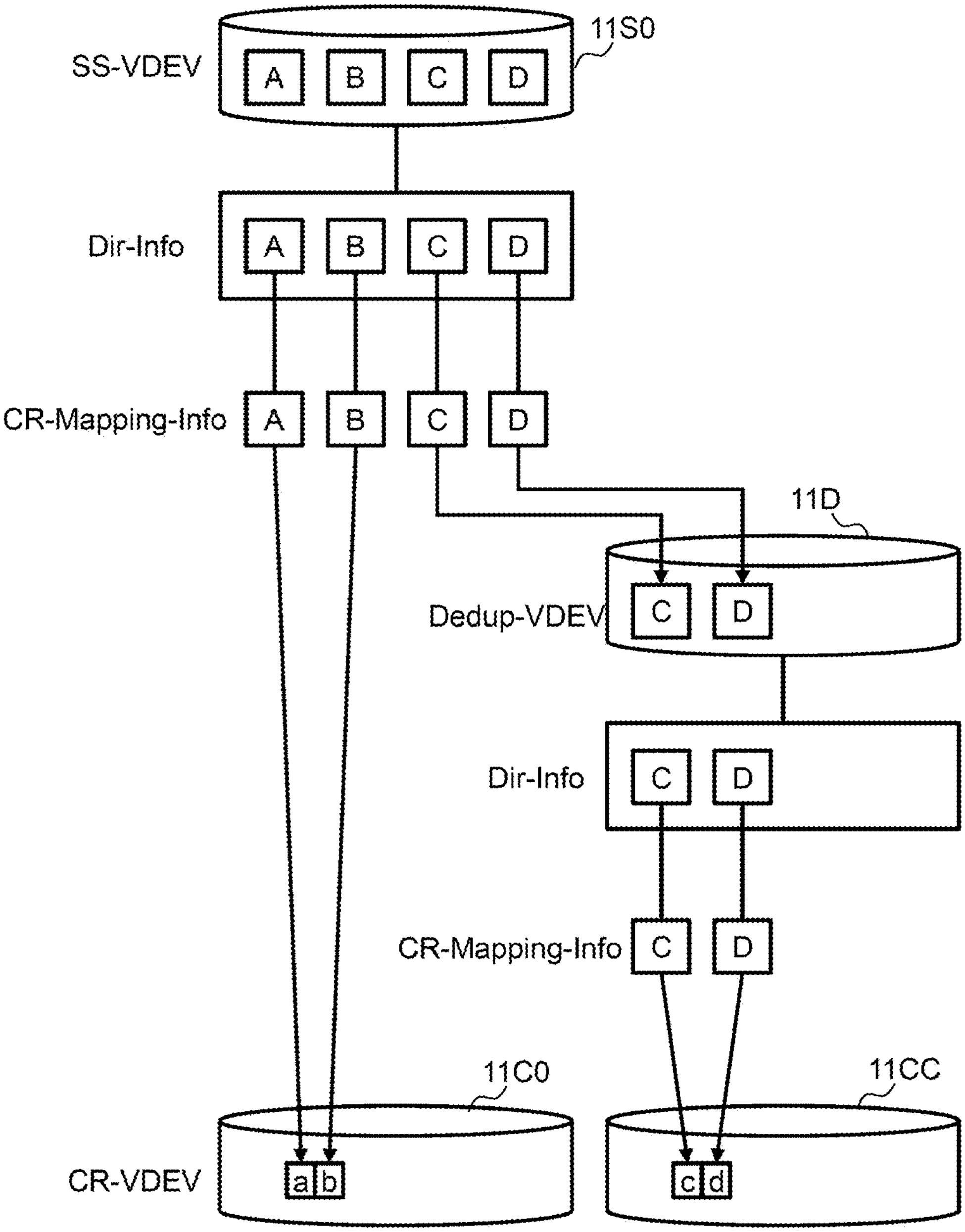
FIG. 4 is a diagram illustrating an overview of management of mapping between addresses in an SS-VDEV and addresses in a Dedup-VDEV, management of mapping between addresses in the SS-VDEV and addresses in a CR-VDEV, and management of mapping between addresses in the Dedup-VDEV and addresses in the CR-VDEV.

FIG. 4 is a diagram illustrating an overview of management of mapping between addresses in the SS-VDEV 11S and addresses in the Dedup-VDEV 11D, management of mapping between addresses in the SS-VDEV 11S and addresses in the CR-VDEV 11C, and management of mapping between addresses in the Dedup-VDEV 11D and addresses in the CR-VDEV 11C. FIG. 4 illustrates the SS-VDEV 11S0 and the CR-VDEVs 11C0 and 11CC as an example.

The processor can manage mapping between addresses in the SS-VDEV 11S0 and addresses in the Dedup-VDEV 11D, mapping between addresses in the SS-VDEV 11S0 and addresses in the CR-VDEV 11C0, and mapping between addresses in the Dedup-VDEV 11D and addresses in the CR-VDEV 11CC by using the meta-information. The meta-information includes the Dir-info and the CR-Mapping-Info, as described above. The processor manages data of the SS-VDEV 11S0 and the Dedup-VDEV 11D by associating the Dir-Info with the CR-Mapping-Info. For data in which the SS-VDEV 11S0 is considered as a storage destination, the Dir-Info includes information indicating an address of a reference source (an address in the SS-VDEV 11S0), and the CR-Mapping-Info corresponding to the data includes information indicating the address of the reference destination (the address in the CR-VDEV 11C0 or the address in the Dedup-VDEV 11D). For data in which the Dedup-VDEV 11D is considered as a storage destination, the Dir-Info includes information indicating an address of a reference source (an address in the Dedup-VDEV 11D), and the CR-Mapping-Info corresponding to the data includes information indicating the address of the reference destination (the address in the CR-VDEV 11CC). Referring to compression allocation information, the processor can specify an address in the SS-VDEV 11S or the Dedup-VDEV 11D from the addresses in the CR-VDEV 11C.

Figure 5:
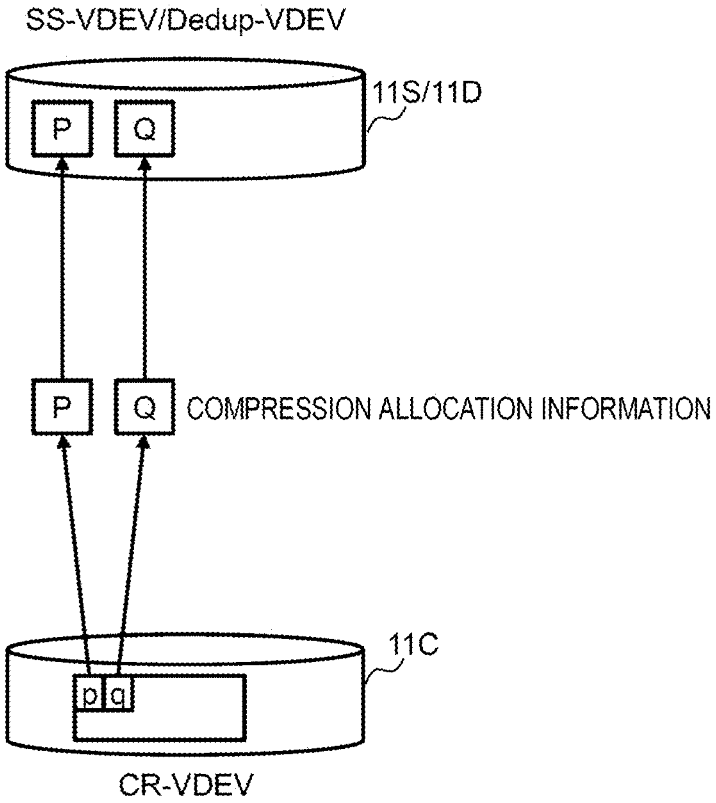
FIG. 5 is a diagram illustrating an overview of reverse-direction mapping from addresses in the CR-VDEV to addresses in the SS-VDEV or the Dedup-VDEV.

FIG. 5 is a diagram illustrating an overview of reverse-direction mapping from addresses in the CR-VDEV 11C to addresses in the SS-VDEV 11S or the Dedup-VDEV 11D.

The storage system stores the compression allocation information for each piece of data in which the SS-VDEV 11S or the Dedup-VDEV 11D is considered as a storage destination. The compression allocation information indicates mapping the address of the reference source (the address in the CR-VDEV 11C) and the address of the reference destination (the address in the SS-VDEV 11S or the Dedup-VDEV 11D). Referring to the compression allocation information, the processor can specify an address in the SS-VDEV 11S or the Dedup-VDEV 11D from the addresses in the CR-VDEV 11C.

Figure 6:
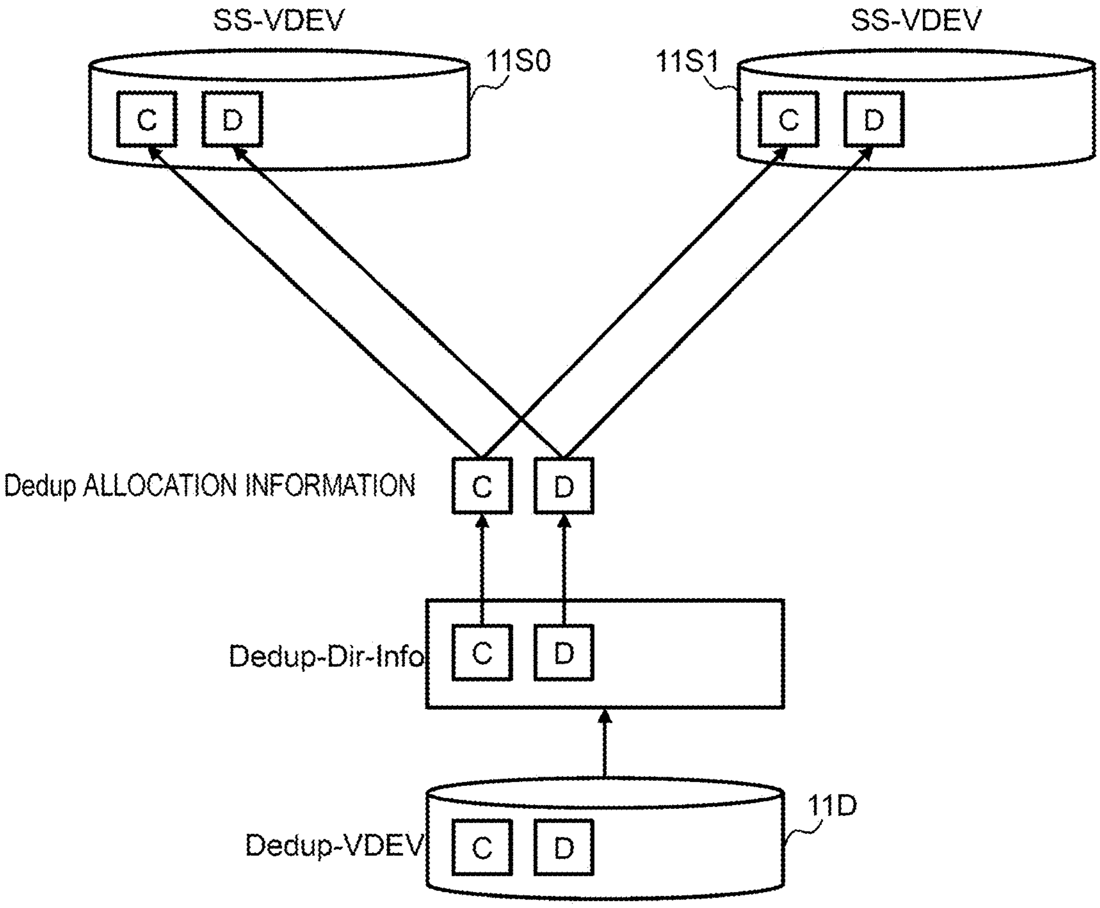
FIG. 6 is a diagram illustrating an overview of reverse-direction mapping from addresses in the Dedup-VDEV to addresses in the SS-VDEV.

FIG. 6 is a diagram illustrating an overview of reverse-direction mapping from addresses in the Dedup-VDEV 11D to addresses in the SS-VDEV 11S.

The storage system includes Dedup-Dir-Info which is Dir-Info for reverse direction mapping for each Dedup-VDEV 11D. For each piece of data in which the Dedup-VDEV 11D is a storage site, information in the Dedup-Dir-Info refers to Dedup allocation information corresponding to the data. The Dedup allocation information indicates an address of duplicated data for each SS-VDEV 11S which the duplicated data considers as a storage destination. Referring to the Dedup-Dir-Info and the Dedup allocation information, the processor can specify the address in each of the SS-VDEVs 11S0 and 11S1 from the addresses in the Dedup-VDEV 11D.

Figure 7:
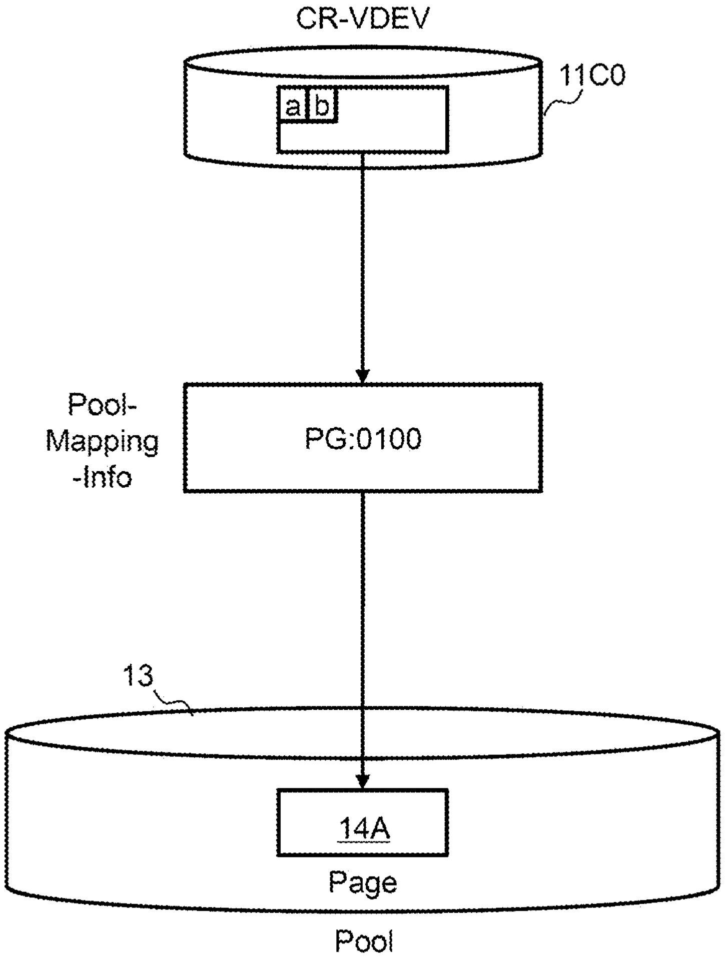
FIG. 7 is a diagram illustrating an overview of management of mapping between addresses in the CR-VDEV and addresses in a page of a pool.

FIG. 7 is a diagram illustrating an overview of management of mapping between addresses in the CR-VDEV 11C and addresses in a page 14 of the pool 13.

Pages 14 serving as continuous regions are allocated to the CR-VDEV 11C. The storage system stores Pool-Mapping-Info for each page 14. Pool-Mapping-Info indicates an address of a reference source (an address in the CR-VDEV 11C) and an address of a reference destination (an address in the page 14). Referring to the Pool-Mapping-Info, the processor can specify an address in the page 14 from the addresses in the CR-VDEV 11C.

Figure 8:
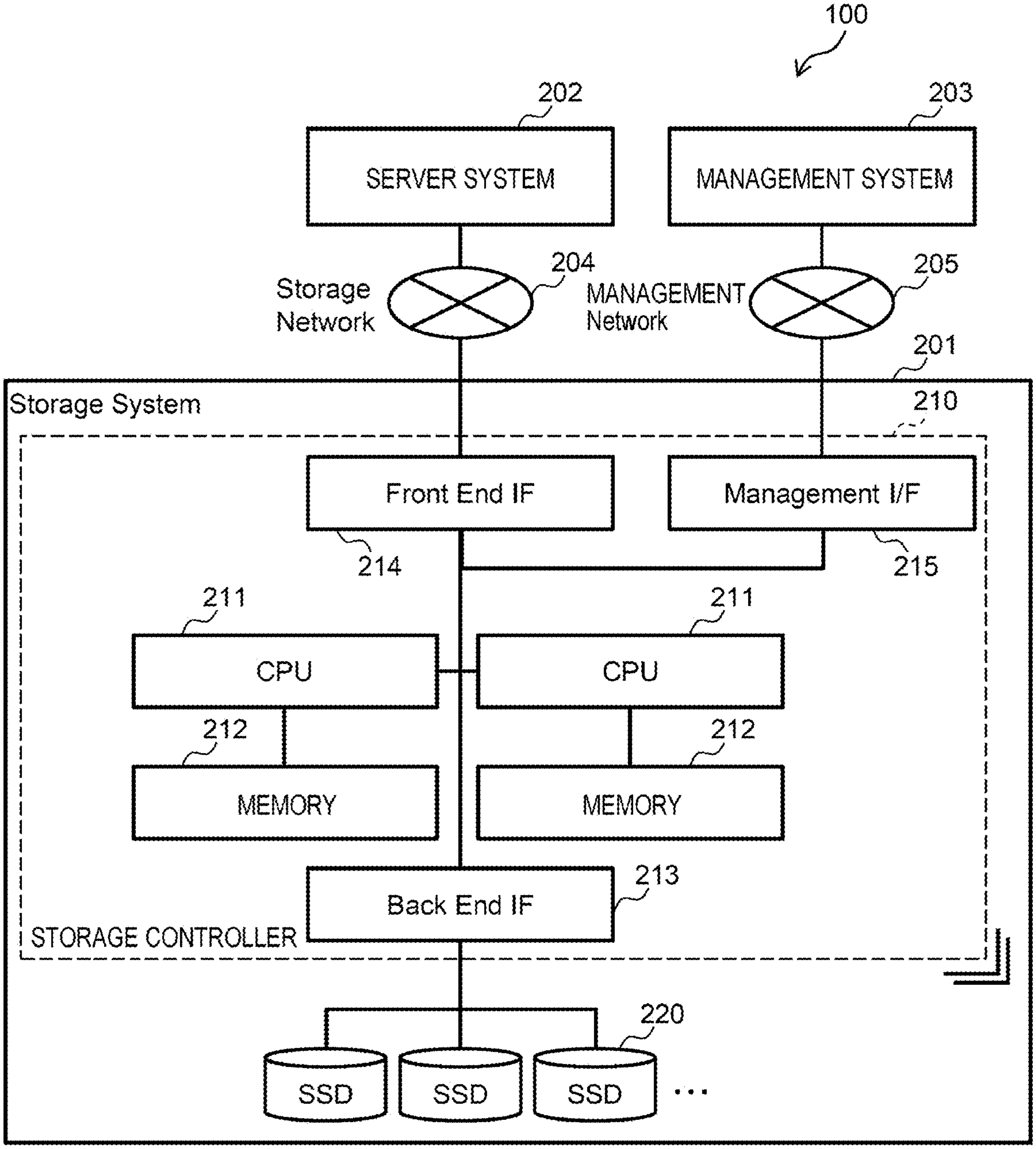
FIG. 8 is a diagram illustrating a hardware configuration of a computer system.

FIG. 8 is a diagram illustrating a hardware configuration of a computer system.

The computer system 100 includes a storage system 201, a server system 202, and a management system 203. The storage system 201 and the server system 202 are connected via a storage network 204 in which a fiber channel (FC) or the like is used. The storage system 201 and the management system 203 are connected via a management network 205 in which the Internet protocol (IP) or the like is used. The storage network 204 and the management network 205 may be the same communication network.

The storage system 201 includes a plurality of storage controllers 210 and a plurality of SSDs 220. The plurality of SSDs 220 are connected to the storage controller 210. The plurality of SSDs 220 are an example of a permanent storage device. The pool 13 is configured based on the plurality of SSDs 220. Data stored in the page 14 of the pool 13 is stored in one or more SSDs 220.

The storage controller 210 includes a CPU 211, a memory 212, a backend interface 213, a frontend interface 214, and a management interface 215.

The CPU 211 executes a program stored in the memory 212.

The memory 212 stores a program which is executed by the CPU 211, data which is used by the CPU 211, and the like. The memories are duplicated as a pair of memory 212 and CPU 211.

The backend interface 213, the frontend interface 214, and the management interface 215 are examples of interface devices.

The backend interface 213 is a communication interface device that relays exchange of data between the SSD 220 and the storage controller 210. The plurality of SSDs 220 are connected to the backend interface 213.

The frontend interface 214 is a communication interface device that relays exchange of data between the server system 202 and the storage controller 210. The server system 202 is connected to the frontend interface 214 via the storage network 204.

The management interface 215 is a communication interface device that relays exchange of data between the management system 203 and the storage controller 210. The management system 203 is connected to the management interface 215 via the management network 205.

The server system 202 includes one or more host devices. The server system 202 transmits a write request or a read request (I/O request) for designating an I/O destination to the storage controller 210. The I/O destination is, a logical volume number such as a logical unit number (LUN), a logical address such as a logical block address (LBA), or the like.

The management system 203 includes one or more management devices. The management system 203 manages the storage system 201.

Figure 9:
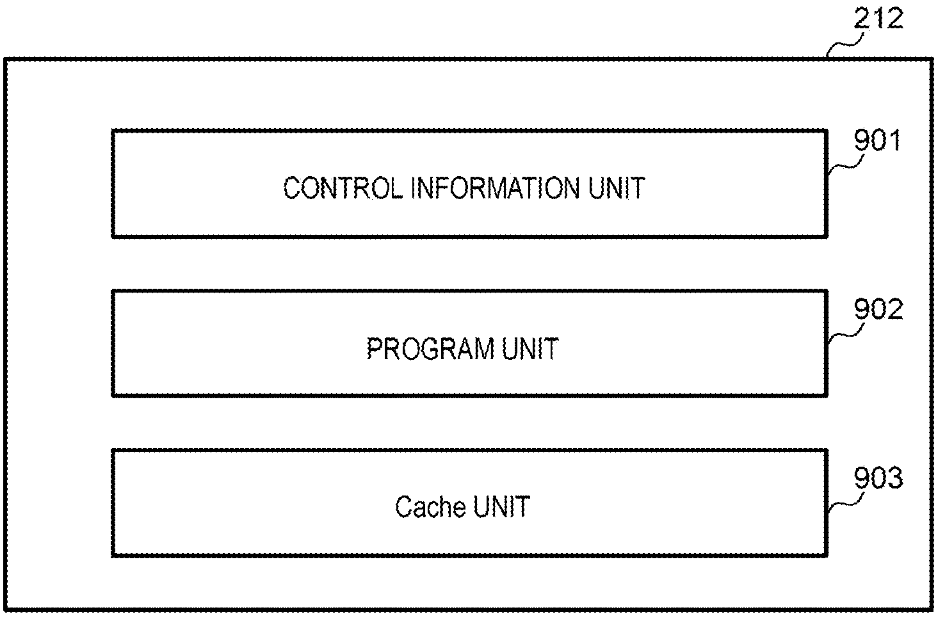
FIG. 9 is a diagram illustrating a configuration of a memory.

FIG. 9 is a diagram illustrating a configuration of the memory 212.

The memory 212 includes a control information unit 901 that stores control information (which may be called management information), a program unit 902 that stores a program, and a cache unit 903 that temporarily stores data.

Figure 10:
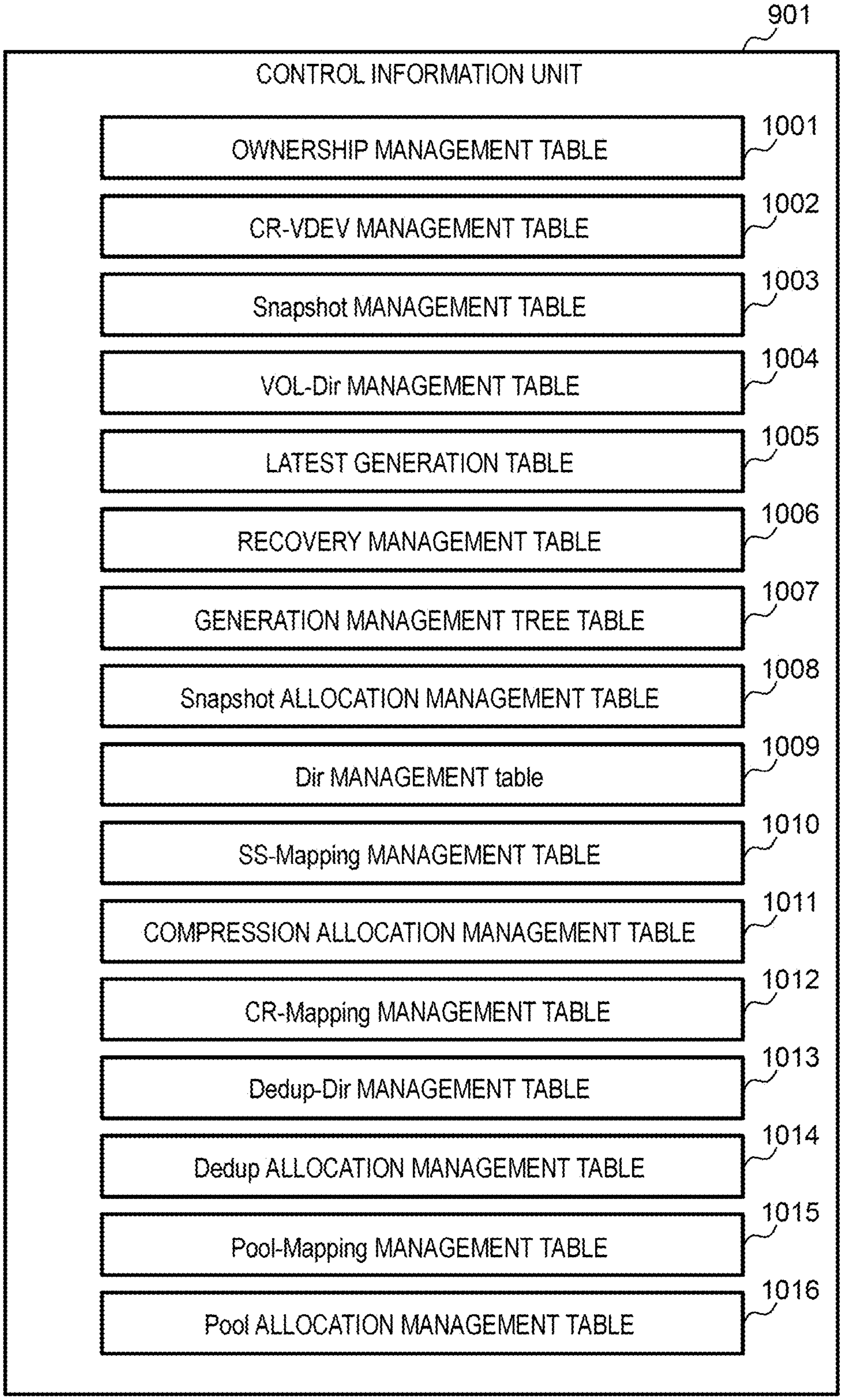
FIG. 10 is a diagram illustrating information stored in a control information unit.

FIG. 10 is a diagram illustrating information stored in the control information unit 901.

The control information unit 901 stores an ownership management table 1001, a CR-VDEV management table 1002, a snapshot management table 1003, a VOL-Dir management table 1004, a latest generation table 1005, a recovery management table 1006, a generation management tree table 1007, a snapshot allocation management table 1008, a Dir management table 1009, an SS-Mapping management table 1010, a compression allocation management table 1011, a CR-mapping management table 1012, a Dedup-Dir management table 1013, a Dedup allocation management table 1014, a pool-mapping management table 1015, and a pool allocation management table 1016.

Figure 11:
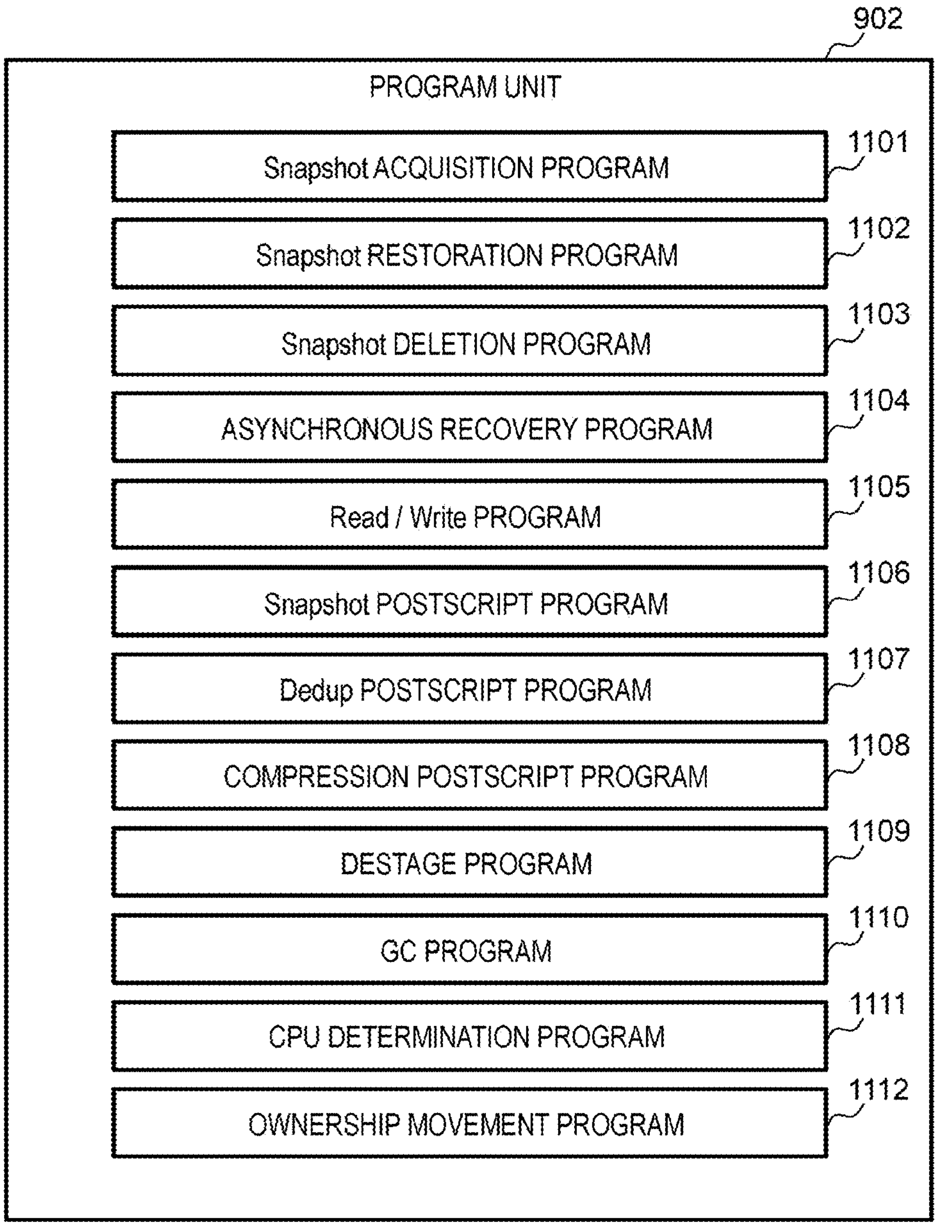
FIG. 11 is a diagram illustrating programs stored in a program unit.

FIG. 11 is a diagram illustrating programs stored in the program unit 902.

The program unit 902 stores a snapshot acquisition program 1101, a snapshot restoration program 1102, a snapshot deletion program 1103, an asynchronous recovery program 1104, a read/write program 1105, a snapshot postscript program 1106, a Dedup postscript program 1107, a compression postscript program 1108, a destage program 1109, a garbage collection (GC) program 1110, a CPU determination program 1111, an ownership movement program 1112.

FIG. 12 is a diagram illustrating a configuration of the ownership management table 1001.

The ownership management table 1001 manages an ownership of the VOL 10 or the VDEV 11. For example, the ownership management table 1001 has an entry for each VOL 10 and each VDEV 11. The entry has information such as a VOL #/VDEV #1201 and an owner CPU #1202.

The VOL #/VDEV #1201 indicates an identification number of the VOL 10 or the VDEV 11. The owner CPU #1202 indicates an identification number of a CPU serving as an owner CPU of the VOL 10 or the VDEV 11 (a CPU that has an ownership of the VOL 10 or the VDEV 11).

The owner CPU may be allocated in units of CPU groups or may be allocated in units of storage controllers 210 instead of being allocated in units of CPUs 211.

FIG. 13 is a diagram illustrating a configuration of the CR-VDEV management table 1002.

The CR-VDEV management table 1002 indicates the CR-VDEV 11C associated with the SS-VDEV 11S or the Dedup-VDEV 11D. For example, the CR-VDEV management table 1002 has an entry for each SS-VDEV 11S and each Dedup-VDEV 11D. The entry has information such as a VDEV #1301 and a CR-VDEV #1302.

The VDEV #1301 indicates an identification number of the SS-VDEV 11S or the Dedup-VDEV 11D. The CR-VDEV #1302 indicates an identification number of the CR-VDEV 11C.

FIG. 14 is a diagram illustrating a configuration of the snapshot management table 1003.

For each PVOL 10P (each SS-Family 9), there is the snapshot management table 1003. The snapshot management table 1003 indicates an acquisition time of each snapshot (SVOL 10S). For example, the snapshot management table 1003 has an entry for each SVOL 10S. The entry has information such as a PVOL #1401, an SVOL #1402, and an acquisition time 1403.

The PVOL #1401 indicates an identification number of the PVOL 10P. The SVOL #1402 indicates an identification number of the SVOL 10S. The acquisition time 1403 indicates an acquisition time of the SVOL 10S.

FIG. 15 is a diagram illustrating a configuration of the VOL-Dir management table 1004.

The VOL-Dir management table 1004 indicates a correspondent relationship between a VOL and Dir-Info. For example, the VOL-Dir management table 1004 has an entry for each VOL 10. The entry has information such as a VOL #1501, a Root-VOL #1502, and a Dir-Info #1503.

The VOL #1501 indicates an identification number of the PVOL 10P or the SVOL 10S. The Root-VOL #1502 indicates an identification number of a Root-VOL. When the VOL 10 is the PVOL 10P, the Root-VOL is the PVOL 10P. When the VOL 10 is the SVOL 10S, the Root-VOL is the PVOL 10P corresponding to the SVOL 10S. The Dir-Info #1503 indicates an identification number of the Dir-Info corresponding to the VOL 10.

FIG. 16 is a diagram illustrating a configuration of the latest generation table 1005.

For each PVOL 10P (each SS-Family 9), there is the latest generation table 1005 indicating a generation (generation #) of the PVOL 10P.

FIG. 17 is a diagram illustrating a configuration of the recovery management table 1006.

The recovery management table 1006 may be, for example, a bitmap. For each PVOL 10P (each SS-Family 9), there is the recovery management table 1006. In other words, for each Dir-Info generation management tree 70, there is the recovery management table 1006. The recovery management table 1006 has an entry for each piece of Dir-Info. The entry has information such as a Dir-Info #1701 and a recovery request 1702.

The Dir-Info #1701 indicates an identification number of the Dir-Info. The recovery request 1702 indicates whether to require a recovery of the Dir-Info. "1" means that a recovery is required and "0" means that the recovery is not required.

Figures 18, 19:
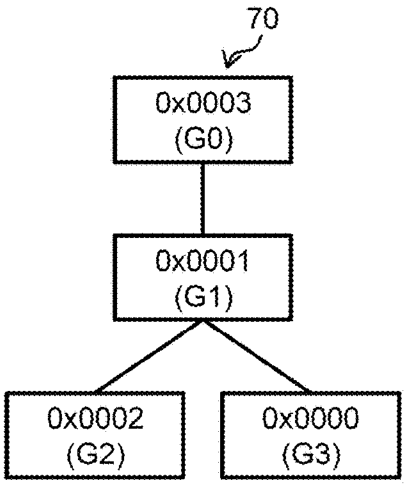
FIG. 18 is a diagram illustrating a configuration of a generation management tree table.
FIG. 19 is a diagram illustrating a configuration of a snapshot allocation management table.

FIG. 18 is a diagram illustrating a configuration of the generation management tree table 1007.

For each PVOL 10P (each SS-Family 9), there is the generation management tree table 1007. In other words, for each Dir-Info generation management tree 70, there is the generation management tree table 1007. The generation management tree table 1007 has an entry for each piece of Dir-Info. The entry has information such as a Dir-Info #1801, a generation #1802, and a Prev 1803, and a Next 1804.

The Dir-Info # indicates an identification number of Dir-Info. The generation #1802 indicates a generation of the VOL 10 corresponding to the Dir-Info. The Prev 1803 indicates Dir-Info of a parent (immediately superior) of the Dir-Info. The Next 1804 indicates the Dir-Info of a child (immediately inferior) of the Dir-Info. The number of pieces of Next 1804 may be the same as the number of pieces of Dir-Info of a child. In FIG. 18, since there are the pieces of Dir-Info of two children, there are two pieces of Next 1804 (a Next-A 1804A and a Next-B 1804B).

FIG. 19 is a diagram illustrating a configuration of the snapshot allocation management table 1008.

For each SS-VDEV 11S, there is the snapshot allocation management table 1008 indicating mapping from an address in the SS-VDEV 11S to an address in the VOL 10. The snapshot allocation management table 1008 has an entry for each address in the SS-VDEV 11S. The entry has information such as a block address 1901, a status 1902, an allocation destination VOL #1903, and an allocation destination address 1904.

The block address 1901 indicates an address of a block in the SS-VDEV 11S. The status 1902 indicates whether the block is allocated to an address of any VOL ("1" means being allocated and "0" means being free). The allocation destination VOL #1903 indicates an identification number of the VOL 10 (the PVOL 10P or the SVOL 10S) that has an address of an allocation destination of the block ("n/a" means non-allocation). The allocation destination address 1904 indicates an address of an allocation destination of the block (a block address) ("n/a" means non-allocation).

FIG. 20 is a diagram illustrating a configuration of the Dir management table 1009.

For each piece of Dir-Info, there is the Dir management table 1009 indicating Mapping-Info of a reference destination for each piece of data (each piece of block data). For example, the Dir management table 1009 has an entry for each address (block address). The entry has information such as a VOL/VDEV address 2001 and a reference destination Mapping-Info #2002.

The VOL/VDEV address 2001 indicates an address (block address) in the VOL 10 (the PVOL 10P or the SVOL 10S) or an address in the VDEV 11 (the SS-VDEV 11S or the Dedup-VDEV 11D). The reference destination Mapping-Info #2002 indicates an identification number of the Mapping-Info of the reference destination.

FIG. 21 is a diagram illustrating a configuration of the SS-Mapping management table 1010.

For each piece of Dir-Info of the VOL 10, there is the SS-Mapping management table 1010. The SS-Mapping management table 1010 has an entry for each piece of SS-Mapping-Info corresponding to the Dir-Info of the VOL 10. The entry has information such as a Mapping-Info #2101, a reference destination address 2102, a reference destination SS-VDEV #2103, and a generation #2104.

The Mapping-Info #2101 indicates an identification number of the SS-Mapping-Info. The reference destination address 2102 indicates an address referred to by the SS-Mapping-Info (an address in the SS-VDEV 11S). The reference destination SS-VDEV #2103 indicates an identification number of the SS-VDEV 11S that has an address referred to by the SS-Mapping-Info. The generation #2104 indicates a generation of data corresponding to the SS-Mapping-Info.

FIG. 22 is a diagram illustrating a configuration of the compression allocation management table 1011.

For each CR-VDEV 11C, there is the compression allocation management table 1011 that has compression allocation information for each sub-block in the CR-VDEV 11C. The compression allocation management table 1011 has an entry corresponding to the compression allocation information for each sub-block in the CR-VDEV 11C. The entry has information such as a sub-block address 2201, a data length 2202, a status 2203, a head sub-block address 2204, an allocation destination VDEV #2205, and an allocation destination address 2206.

The sub-block address 2201 indicates an address of the sub-block. The data length 2202 indicates the number of sub-blocks included in a sub-block group (one or more sub-blocks) in which compressed data is stored (for example, "2" means that there is compressed data in two sub-blocks). The status 2203 indicates a status of the sub-block ("0" means being free, "1" means being allocated, and "2" means a garbage collection (GC) target). The head sub-block address 2204 indicates an address of a head sub-block (one or more sub-blocks in which the compressed data is stored) of one or more sub-blocks including the sub-block. The allocation destination VDEV #2205 indicates an identification number of the VDEV 11 (the SS-VDEV 11S or the Dedup-VDEV 11D) including a block of an allocation destination of the sub-block. The allocation destination address 2206 indicates an address of the allocation designation of the sub-block (a block address in the SS-VDEV 11S or the Dedup-VDEV 11D).

FIG. 23 is a diagram illustrating a configuration of the CR-mapping management table 1012.

For each piece of Dir-Info of the Dedup-VDEV 11D, there is the CR-mapping management table 1012. The CR-mapping management table 1012 has an entry for each piece of CR-Mapping-Info corresponding to the Dir-Info of the Dedup-VDEV 11D. The entry has information such as a Mapping-Info #2301, a reference destination address 2302, a reference destination CR-VDEV #2303, and a data length 2304.

The Mapping-Info #2301 indicates an identification number of the CR-Mapping-Info. The reference destination address 2302 indicates an address referred to by the CR-Mapping-Info (an address of the head sub-block in the sub-block group). The reference destination CR-VDEV #2303 indicates an identification number of the CR-VDEV 11C that has a sub-block address referred to by the CR-Mapping-Info. The data length 2304 indicates the number of blocks (a block in Dedup-VDEV 11D) referred to by the CR-Mapping-Info or the number of sub-blocks included in the sub-block group referred to by the CR-Mapping-Info.

FIG. 24 is a diagram illustrating a configuration of the Dedup-Dir management table 1013.

For each Dedup-VDEV 11D, there is the Dedup-Dir management table 1013 corresponding to Dedup-Dir-Info. The Dedup-Dir management table 1013 has an entry for each address in the Dedup-VDEV 11D. The entry has information such as a Dedup-VDEV address 2401 and a reference destination allocation information #2402.

The Dedup-VDEV address 2401 indicates an address (block address) in the Dedup-VDEV 11D. The reference destination allocation information #2402 indicates an identification number of Dedup allocation information of the reference destination.

FIG. 25 is a diagram illustrating a configuration of the Dedup allocation management table 1014.

For each Dedup-VDEV 11D (each piece of Dedup-Dir-Info), there is the Dedup allocation management table 1014 indicating mapping from Dedup allocation information corresponding to an address in the Dedup-VDEV 11D to an address in the SS-VDEV 11S. The Dedup allocation management table 1014 has an entry for each piece of Dedup allocation information. The entry has information such as an allocation information #2501, an allocation destination SS- VDEV #2502, an allocation destination address 2503, and a connection allocation information #2504.

The allocation information #2501 indicates an identification number of the Dedup allocation information. The allocation destination SS-VDEV #2502 indicates an identification number of the SS-VDEV 11S that has an address referred to by the Dedup allocation information. The allocation destination address 2503 indicates an address (a block address in the SS-VDEV 11S) referred to by the Dedup allocation information. The connection allocation information #2504 indicates an identification number of the Dedup allocation information connected to the Dedup allocation information.

In FIG. 25, a Dedup allocation information #3 is connected to a Dedup allocation information #1 and there is no Dedup allocation information connected to the Dedup allocation information #3. Therefore, it can be understood that duplicated data at a Dedup-VDEV address corresponding to the Dedup allocation information #1 is duplicated data in the SS-VDEV 11S referred to by the Dedup allocation information #1 and the SS-VDEV 11S referred by the Dedup allocation information #3. Since the number of pieces of duplicated data is indefinite, the Dedup allocation information is connected in accordance with the number of pieces of duplicated data. When duplicated data is in N SS-VDEVs 11S, N pieces of sequential Dedup allocation information are prepared.

FIG. 26 is a diagram illustrating a configuration of the pool-mapping management table 1015.

For each CR-VDEV 11C, there is the pool-mapping management table 1015. The pool-mapping management table 1015 has an entry for each region in units of page sizes in the CR-VDEV 11C. The entry has information such as a VDEV address 2601 and a page #2602.

The VDEV address 2601 indicates a head address of a region (for example, a plurality of blocks) in units of page sizes. The page #2602 indicates an identification number of the allocated page 14 (for example, an address in the pool 13 of the page 14). When there are the plurality of pools 13, the page #2602 may include identification number of the pools 13 having the page 14.

FIG. 27 is a diagram illustrating a configuration of the pool allocation management table 1016.

For each pool 13, there is the pool allocation management table 1016, for example, when there are the plurality of pools 13. The pool allocation management table 1016 indicates a correspondent relationship between the page 14 and a region in the CR-VDEV 11C. The pool allocation management table 1016 has an entry for each page 14. The entry has information such as a page #2701, an RG #2702, a head address 2703, a status 2704, an allocation destination VDEV #2705, and an allocation destination address 2706.

The page #2701 indicates an identification number of the page 14. The RG #2702 indicates an identification number of the RAID group (in the embodiment, the RAID group including two or more SSDs 220) in which the page 14 is a basis. The head address 2703 indicates a head address of the page 14. The status 2704 indicates a status of the page 14 ("1" means being allocated and "0" means being free). The allocation destination VDEV #2705 indicates an identification number of the CR-VDEV 11C to which the page 14 is allocated ("n/a" means non-allocation). The allocation destination address 2706 indicates an allocation destination address (an address in the CR-VDEV 11C) of the page 14 ("n/a" means non-allocation).

Hereinafter, examples of processes executed in the embodiment will be described.

Figure 28:
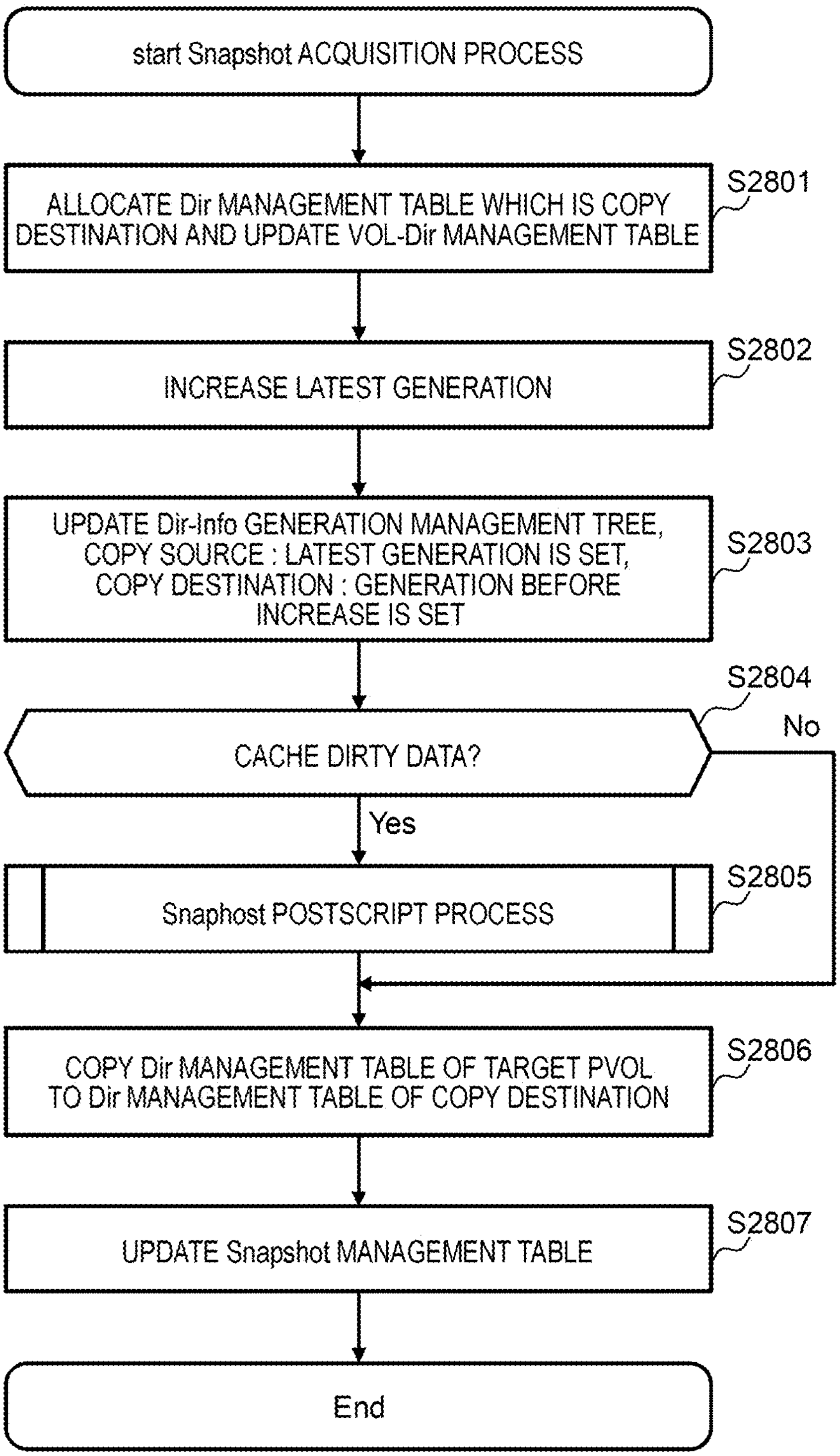
FIG. 28 is a flowchart illustrating a flow of a snapshot acquisition process.

FIG. 28 is a flowchart illustrating a flow of a snapshot acquisition process. The snapshot acquisition process is executed by the snapshot acquisition program 1101 in response to a snapshot acquisition instruction from the management system 203 (or a separate system such as the server system 202). In the snapshot acquisition instruction, for example, a target PVOL 10P is designated.

First, the snapshot acquisition program 1101 allocates the Dir management table 1009 which is a copy destination and updates the VOL-Dir management table 1004 (S2801).

The snapshot acquisition program 1101 increases latest generation # (S2802) and updates the generation management tree table 1007 (Dir-Info generation management tree 70) (S2803). At this time, the snapshot acquisition program 1101 sets latest generation # in a copy source and sets generation # before the increase in a copy destination.

The snapshot acquisition program 1101 determines whether there is cache dirty data in the target PVOL 10P (S2804). The "cache dirty data" may be data which has not yet been written in the pool 13 among data stored in the cache unit 903.

When a determination result of S2804 is positive (Yes in S2804), the snapshot acquisition program 1101 causes the snapshot postscript program 1106 to execute the snapshot postscript process (S2805).

When the determination result of S2804 is negative (No in S2804) or after S2805, the snapshot acquisition program 1101 copies the Dir management table 1009 of the target PVOL 10P to the Dir management table 1009 of the copy destination (S2806).

Thereafter, the snapshot acquisition program 1101 updates the snapshot management table 1003 (S2807) and ends the process. In S2807, an entry that has the acquisition time 1403 indicating acquisition times of PVOL #1401 indicating an identification number of the target PVOL 10P and SVOL #1402 indicating an identification number of the acquired snapshot (SVOL 10S) is added.

Figure 29:
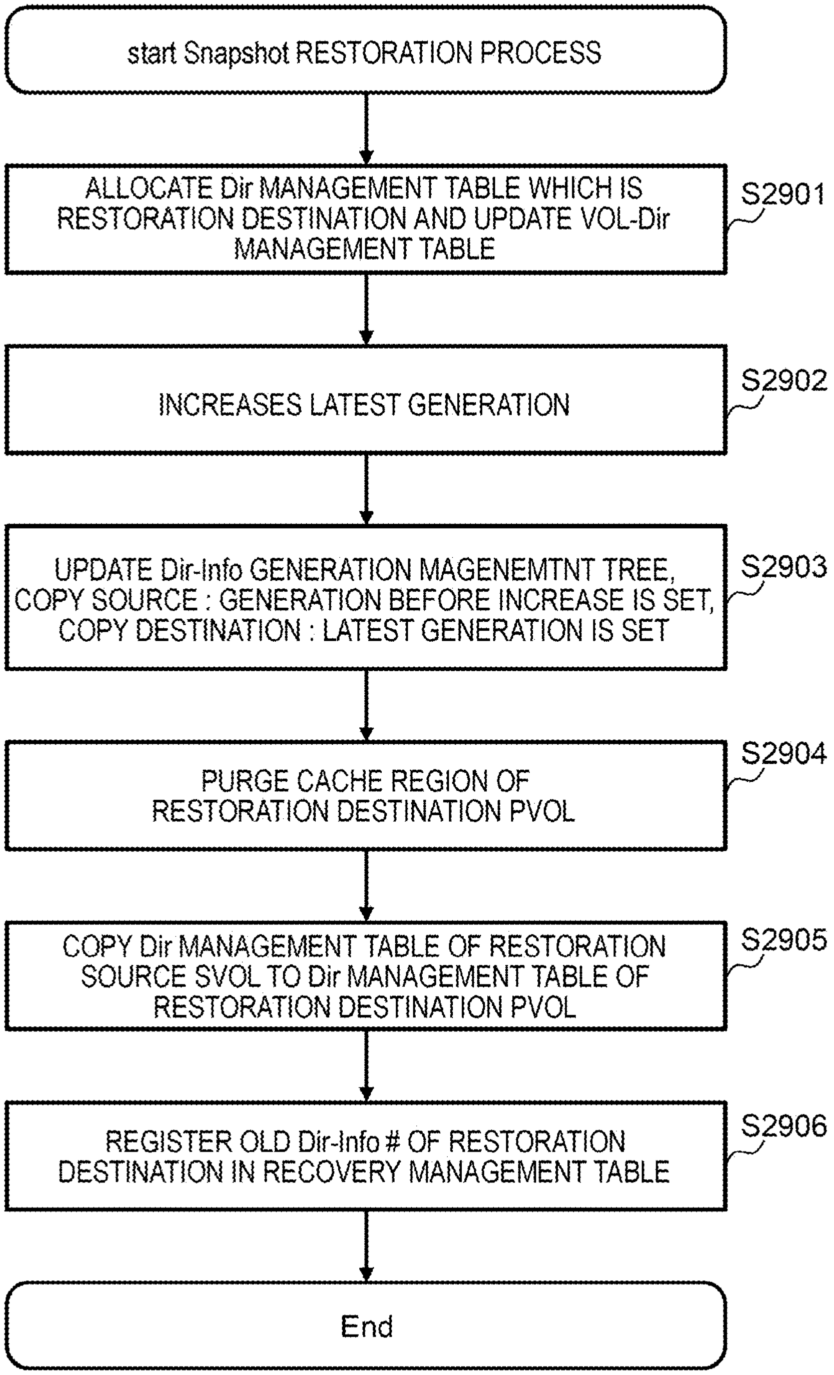
FIG. 29 is a flowchart illustrating a flow of a snapshot restoration process.

FIG. 29 is a flowchart illustrating a flow of a snapshot restoration process. The snapshot restoration process is executed by the snapshot restoration program 1102 in response to a restoration instruction from the management system 203 (or a separate system such as the server system 202). In the restoration instruction, for example, a restoration source SVOL and a restoration destination PVOL are designated.

First, the snapshot restoration program 1102 allocates the Dir management table 1009 which is a restoration destination and updates the VOL-Dir management table 1004 (S2901).

The snapshot restoration program 1102 increases latest generation # (S2902) and updates the generation management tree table 1007 (Dir-Info generation management tree 70) (S2903). At this time, the snapshot restoration program 1102 sets generation # before the increase in a copy source and sets latest generation # in a copy destination.

The snapshot restoration program 1102 purges a cache region (a region in the cache unit 903) of a restoration destination PVOL (S2904).

The snapshot restoration program 1102 copies the Dir management table 1009 of a restoration source SVOL to the Dir management table 1009 of a restoration destination PVOL (S2905).

Thereafter, the snapshot restoration program 1102 registers Dir-Info # of old Dir-Info of the restoration destination in the recovery management table 1006 (S2906) and ends the process. In S2906, the recovery request 1702 corresponding to Dir-Info # is considered as "1."

Figure 30:
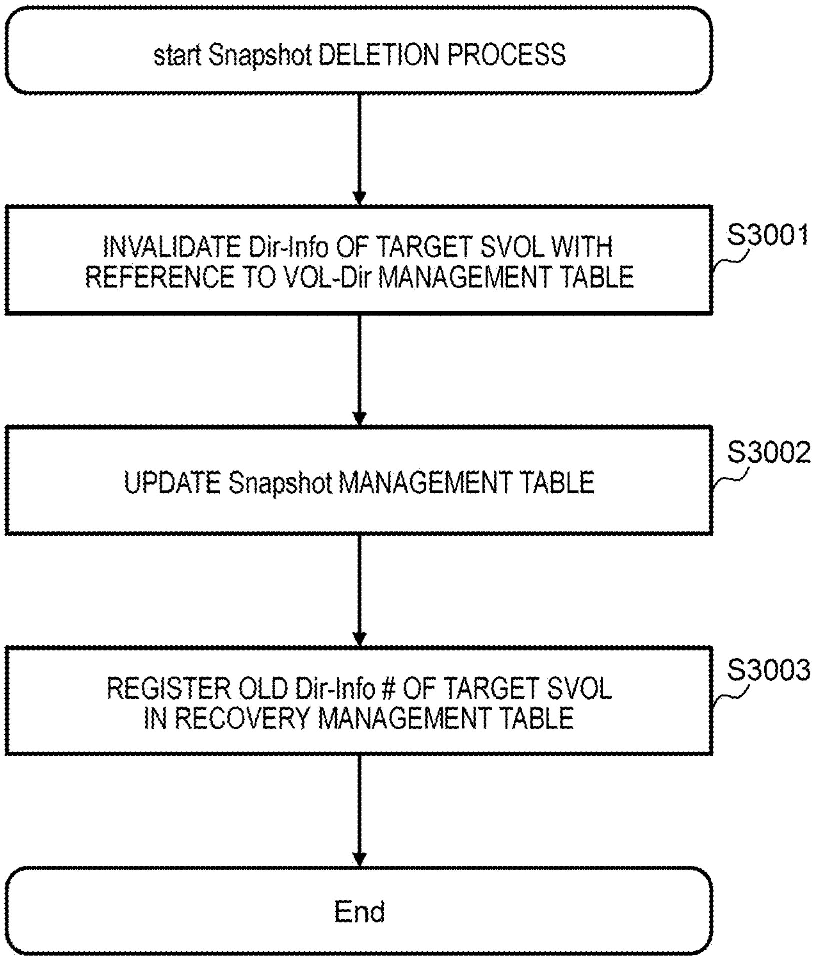
FIG. 30 is a flowchart illustrating a flow of a snapshot deletion process.

FIG. 30 is a flowchart illustrating a flow of a snapshot deletion process. The snapshot deletion process is executed by the snapshot deletion program 1103 in response to a snapshot deletion instruction from the management system 203 (or a separate system such as the server system 202). In the restoration instruction, for example, a target SVOL is designated.

First, referring to the VOL-Dir management table 1004, the snapshot deletion program 1103 invalidates Dir-Info (Dir-Info #1503) of the target SVOL (S3001).

Then, the snapshot deletion program 1103 updates the snapshot management table 1003 (S3002), registers old Dir-Info # of the target SVOL in the recovery management table 1006 (S3003), and ends the process. In S3003, the recovery request 1702 corresponding to Dir-Info # is considered as "1."

Figure 31:
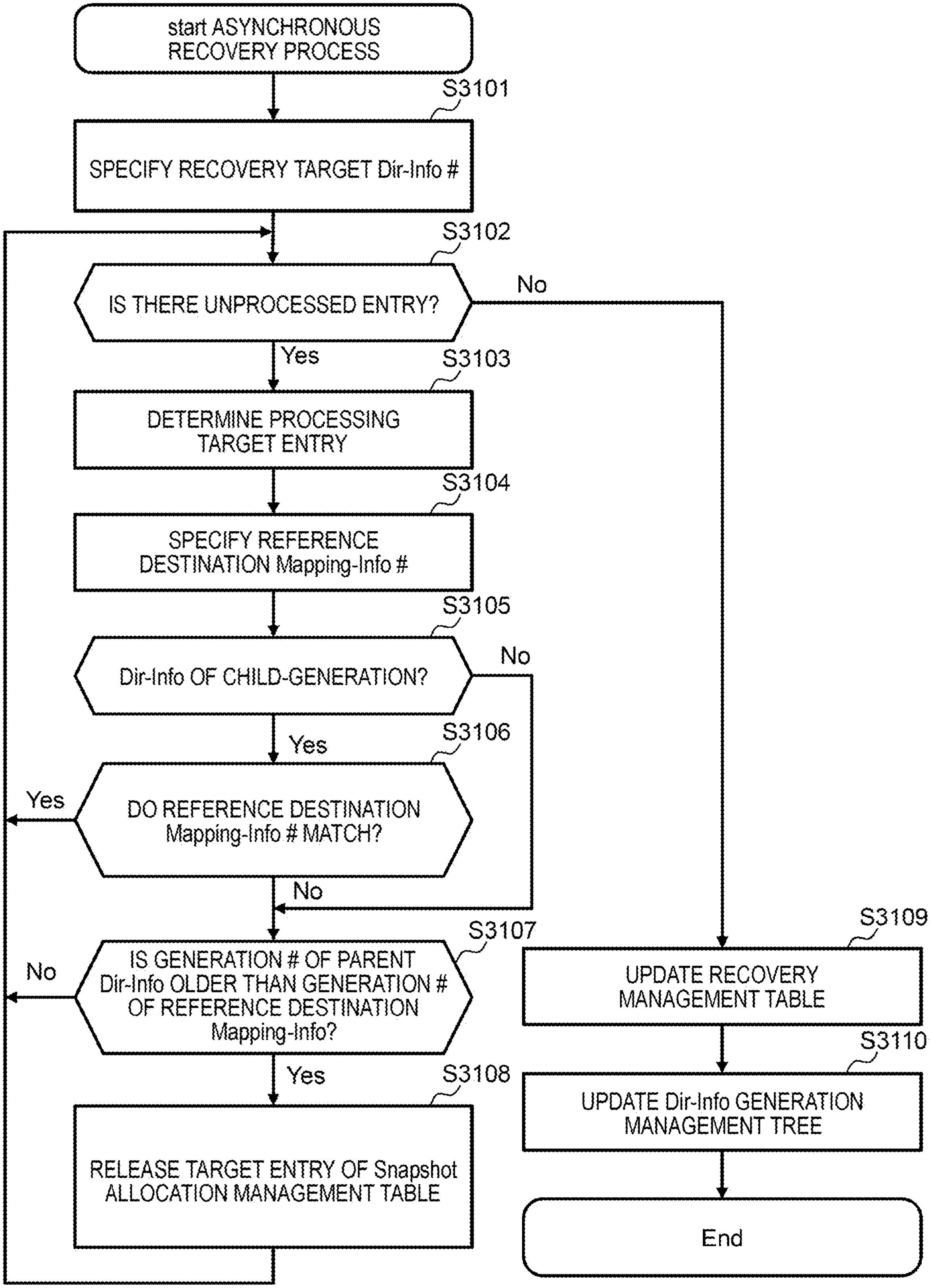
FIG. 31 is a flowchart illustrating a flow of an asynchronous recovery process.

FIG. 31 is a flowchart illustrating a flow of an asynchronous recovery process. The asynchronous recovery process is executed, for example, periodically by the asynchronous recovery program 414.

First, the asynchronous recovery program 1104 specifies recovery target Dir-Info # from the recovery management table 1006 (S3101). "Recovery target Dir-Info #" is Dir-Info # in which the recovery request 1702 is "1." Referring to the generation management tree table 1007, the asynchronous recovery program 1104 confirms an entry of recovery target Dir-Info # and does not select Dir-Info that has two or more children.

Thereafter, the asynchronous recovery program 1104 determines whether there is an unprocessed entry (S3102). The "unprocessed entry" mentioned here is one piece of Mapping-Info referred to by Dir-Info specified in S3101.

When a determination result of S3102 is positive (Yes in S3102), the asynchronous recovery program 1104 determines a processing target entry (an entry including the recovery request 1702 "1") from one or more unprocessed entries (S3103) and specifies reference destination Mapping-Info #2002 from the Dir management table 1009 corresponding to the target Dir-Info (Dir-Info identified from Dir-Info #1701 in the processing target entry) (S3104).

Referring to the generation management tree table 1007, the asynchronous recovery program 1104 determines whether there is Dir-Info of a child generation of the target Dir-Info (S3105).

When a determination result of S3105 is positive (Yes in S3105), the asynchronous recovery program 1104 specifies reference destination Mapping-Info #2002 from the Dir management table 1009 corresponding to Dir-Info of the child generation and determines whether the reference destination Mapping-Info #2002 of the target Dir-Info matches the reference destination Mapping-Info #2002 of Dir-Info of the child generation (S3106). When a determination result of S3106 is positive (Yes in S3106), the process returns to S3102. The entry acquired in S3103 is one entry in Dir-info. On the other hand, the entry for which it is determined in S3106 whether Mapping-Info # matches is an entry corresponding to an address in the same SVOL in Dir-Info of the child.

When the determination result of S3106 is negative (No in S3106) or the determination result of S3105 is negative (No in S3105), the asynchronous recovery program 1104 determines whether generation # of Dir-Info of a parent generation of the target Dir-Info is older than generation #2104 (see FIG. 21) of the reference destination Mapping-Info of the target Dir-Info (S3107). When a determination result of S3107 is negative (No in S3107), the process returns to S3102. The determination of S3107 is executed on Mapping-Info corresponding to the same address as the address in the VOL managed by the entry specified in S3103 among the entries in the target Dir-Info.

When the determination result of S3107 is positive (Yes in S3107), the asynchronous recovery program 1104 initializes the target entry of the SS-Mapping management table 1010 and releases the target entry of the snapshot allocation management table 1008 (S3108). Thereafter, the process returns to S3102. The releasing in S3108 corresponds to releasing of a block in the SS-VDEV. S3108 corresponds to the invalidation in units of Mapping-Info. In S3108, the "target entry" is an entry corresponding to a block address referred to from SS-Mapping-Info in which the determination result of S3107 corresponds to Yes.

When a determination result of S3102 is negative (No in S3102), the asynchronous recovery program 1104 updates the recovery management table 1006 (S3109), updates the generation management tree table 1007 (Dir-Info generation management tree 70) (S3110), and ends the process. S3109 is recovery of Dir-Info and the recovery request 1702 is updated from "1" to "0." When Mapping-Info referred to by recovery target Dir-Info is also referred to from another Dir-Info, Mapping-Info remains and target Dir-Info is recovered. In S3110, the invalidated (recovered) Dir-Info is picked from the tree and a connection relationship of the tree is updated.

Figure 32:
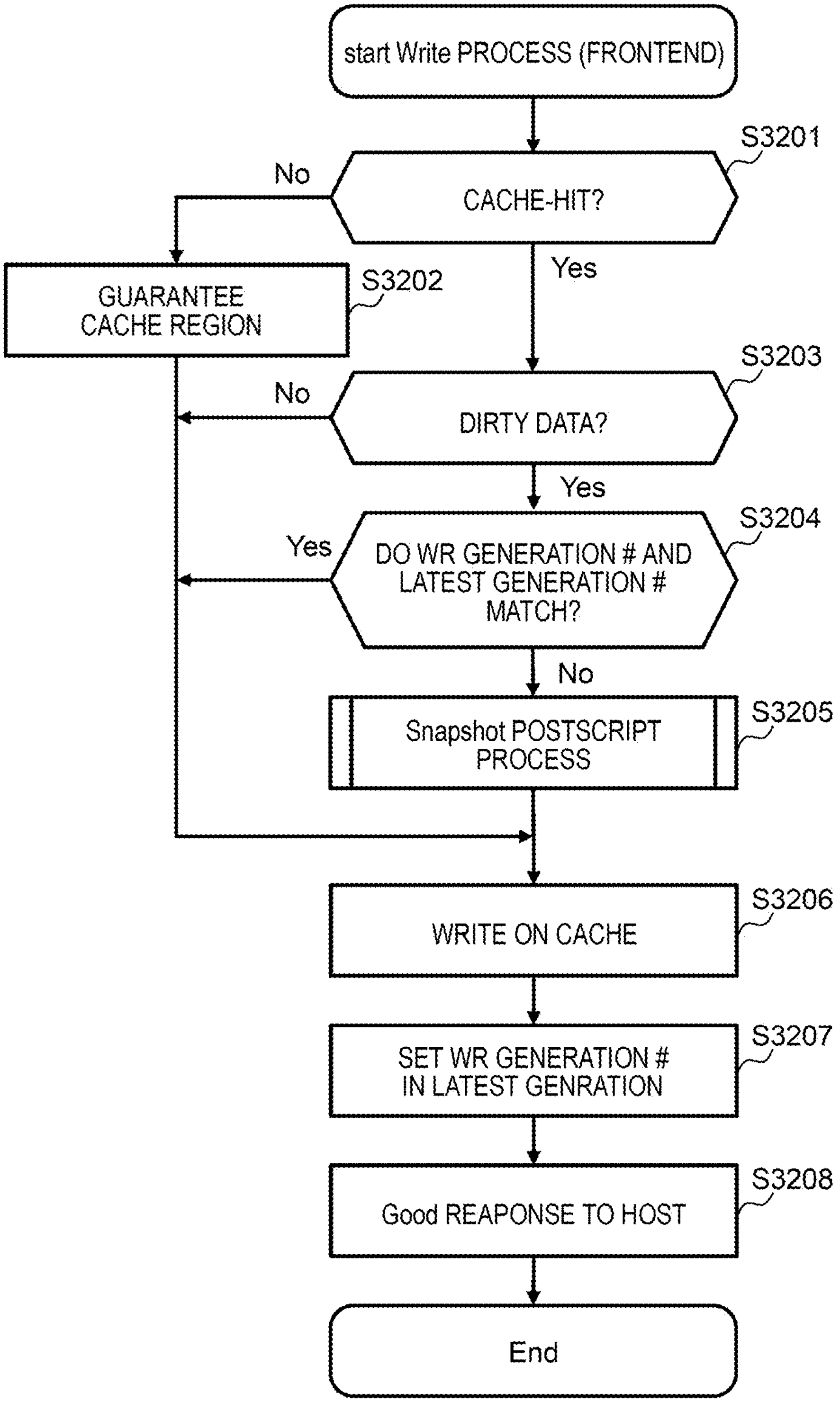
FIG. 32 is a flowchart illustrating a flow of a write process (frontend)

FIG. 32 is a flowchart illustrating a flow of a write process (frontend). The write process (frontend) is executed by the read/write program 1105 when a write request is received from the server system 202.

First, the read/write program 1105 determines whether target data of the write request is cache-hit data (S3201). The "cache-hit" means that a cache region corresponding to a write destination VOL address (a VOL address designated in the write request) of target data has been guaranteed. When a determination result of S3201 is negative (No in S3201), the read/write program 1105 guarantees a cache region corresponding to the write destination VOL address of the target data from the cache unit 903 (S3202). Thereafter, the process proceeds to S3206.

When a determination result of S3201 is positive (Yes in S3201), the read/write program 1105 determines whether the cache-hit data (data in the guaranteed cache region) is dirty data (data not reflected (unwritten) in the pool 13) (S3203). When the determination result of S3203 is negative (No in S3203), the process proceeds to S3206.

When the determination result of S3203 is positive (Yes in S3203), the read/write program 1105 determines whether write (WR) generation # of the dirty data matches generation # of target data of the write request (S3204). "WR generation #" is latest generation # of the snapshot at the time of writing of data on a cache and is stored in, for example, management information (not illustrated) of the cache data. Generation # of the target data of the write request is acquired from latest generation #403. S3204 is a process of preventing the dirty data from being updated to the target data of the write request and data of the snapshot from being written while the postscript process on the target data (the dirty data) of the immediately previously acquired snapshot is not executed. When data written earlier than a host write (a write conforming with a write request from the server system 202) has already been on the cache and a snapshot before the host write is taken, data on the cache becomes data of the snapshot. In this state, when a request for the host write is received, the WR generation # does not match latest generation #.

When the determination result of S3204 is negative (No in S3204), the read/write program 1105 causes the snapshot postscript program 1106 to execute the snapshot postscript process (S3205).

After S3202 or when a determination result of S3204 is positive (Yes in S3204), the read/write program 1105 writes target data of the write request in the cache region guaranteed in S3202 or the cache region obtained in S3205 (S3206). Thereafter, the read/write program 1105 sets WR generation # of the data written in S3206 to latest generation # compared in S3204 (S3207) and returns a normal response (Good response) to the server system 202 (S3208).

Figure 33:
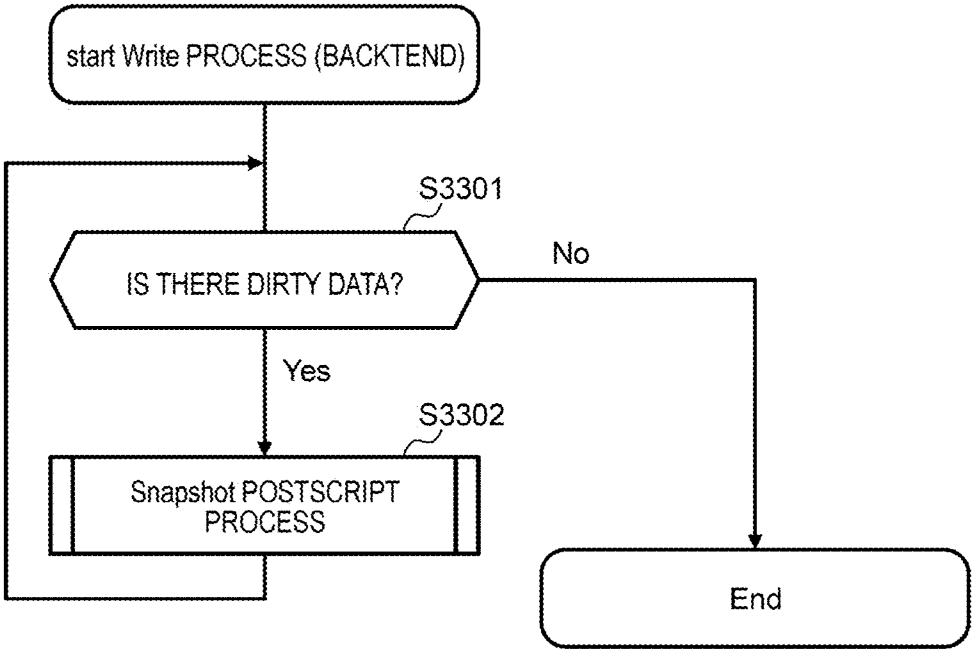
FIG. 33 is a flowchart illustrating a flow of a write process (backend)

FIG. 33 is a flowchart illustrating a flow of a write process (backend). The write process (backend) is a process of writing unreflected data in the pool 13 when the unreflected data (the dirty data) is on the cache unit 903. The write process (backend) is executed synchronously or asynchronously with the write process (frontend). The write process (backend) is executed by the read/write program 1105.

The read/write program 1105 determines whether the dirty data is on the cache unit 903 (S3301). When a determination result of S3301 is positive (Yes in S3301), the read/write program 1105 causes the snapshot postscript program 1106 to execute the snapshot postscript process (S3302).

Figure 34:
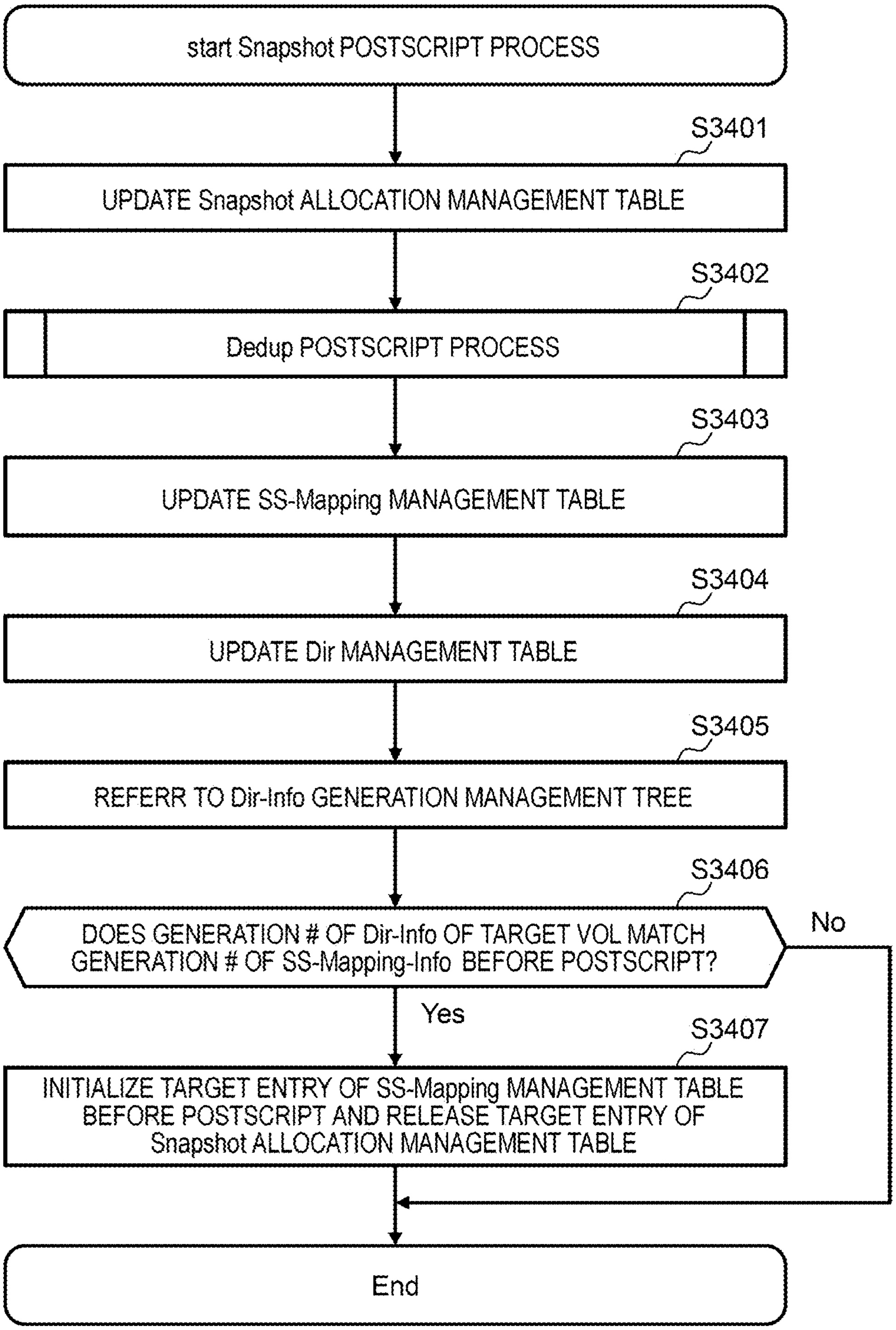
FIG. 34 is a flowchart illustrating a flow of a snapshot postscript process.

FIG. 34 is a flowchart illustrating a flow of a snapshot postscript process. The snapshot postscript process is executed by the snapshot postscript program 1106 called from the snapshot acquisition program 1101 or the read/write program 1105.

The snapshot postscript program 1106 guarantees a new region (a block address in which the status 1902 is "0") in the target SS-VDEV 11S (the SS-VDEV 11S corresponding to the SS-Family 9 including a target VOL (for example, an acquisition target SVOL or a VOL of a data writing destination) by updating the snapshot allocation management table 1008 (S3401). Then, the snapshot postscript program 1106 causes the Dedup postscript program 1107 to execute the Dedup postscript process (S3402).

Thereafter, the snapshot postscript program 1106 updates the SS-Mapping management table 1010 (S3403). In S3403, for example, the snapshot postscript program 1106 sets latest generation # (generation # indicated by the latest generation table 1005) in generation #2104 corresponding to Mapping-Info # of target SS-Mapping-Info. "Target SS-Mapping-Info" mentioned here is SS-Mapping-Info corresponding to data in the target VOL.

The snapshot postscript program 1106 updates the Dir management table 1009 corresponding to Dir-Info of the target SS-VDEV 11S (S3404). In S3404, SS-Mapping-Info (information indicating a reference destination address in the SS-VDEV) for writing target data is associated with an address in the VOL 10 of the data.

The snapshot postscript program 1106 refers to the generation management tree table 1007 (the Dir-Info generation management tree 70) (S3405) and determines whether generation # of Dir-Info of a target VOL (a write destination VOL of data) matches generation # of SS-Mapping-Info before postscript (S3406). "SS-Mapping-Info before postscript" is Mapping-Info in which data before update is managed (that is, SS-Mapping-Info corresponding to the data before update among Mapping-Info referred to by Dir-Info is a determination target of S3406). "Before postscript" means before the snapshot postscript process is executed.

When a determination result of S3406 is positive (Yes in S3406), the snapshot postscript program 1106 initializes a target entry of the SS-Mapping management table 1010 before postscript (for example, sets an invalid value in the target entry), releases the target entry of the snapshot allocation management table 1008 (specifically, an entry corresponding to a block address indicated by the reference destination address 2102 of the SS-Mapping management table 1010 before postscript) (S3407), and ends the process. In the case of Yes in S3406, it is possible to set an unreferred region to a reusable state through garbage processing by performing the process in S3407.

Figure 35:
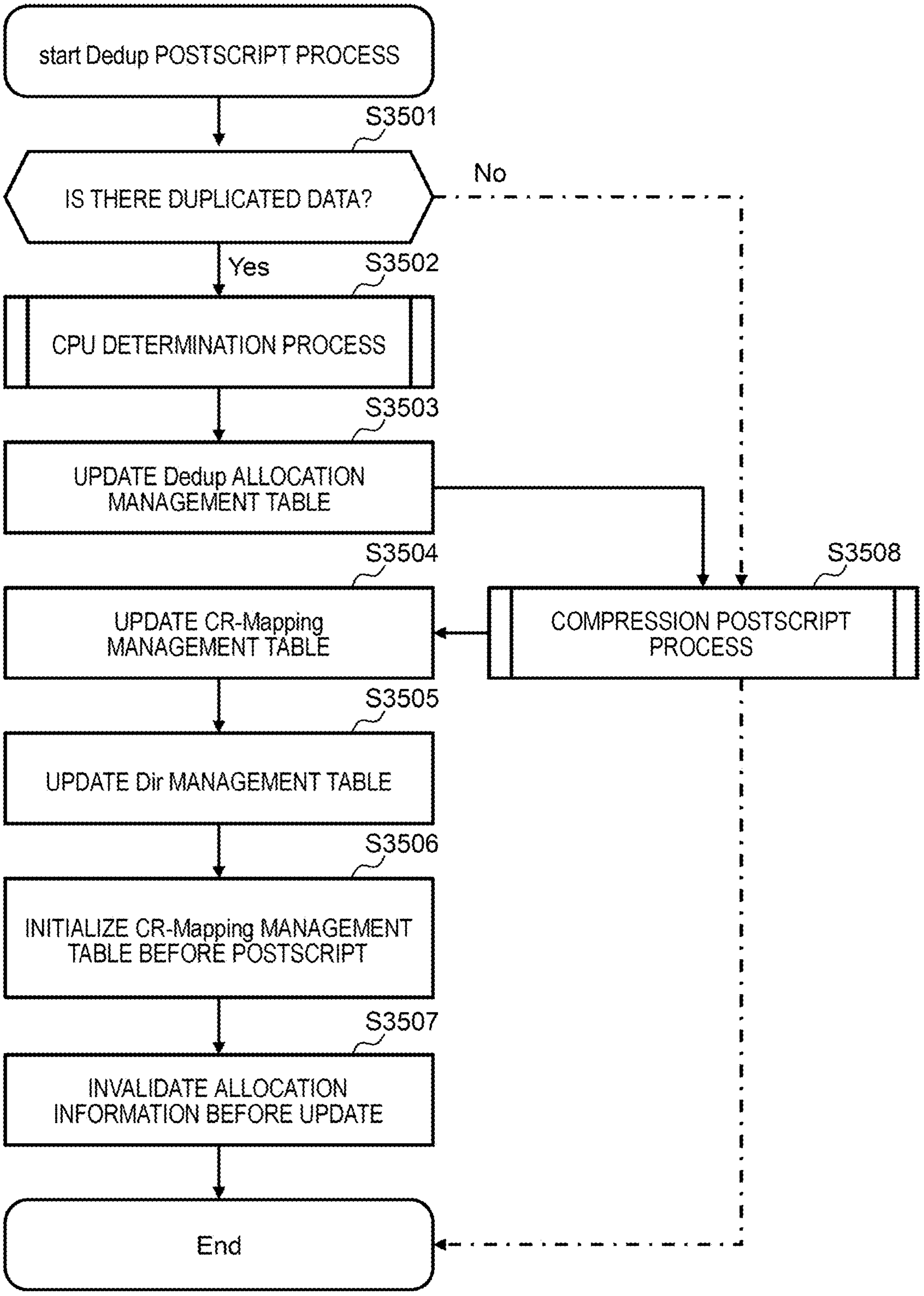
FIG. 35 is a flowchart illustrating a flow of a Dedup postscript process.

FIG. 35 is a flowchart illustrating a flow of a Dedup postscript process. The Dedup postscript process is executed by the Dedup postscript program 1107 called from the Snapshot postscript program 1106.

The Dedup postscript program 1107 determines whether there is duplicated data (S3501). When a determination result of S3501 is negative (No in S3501), the Dedup postscript program 1107 causes the compression postscript program 1108 to execute the compression postscript process (S3508). Accordingly, compressed data of data of which a storage destination is the SS-VDEV 11S is stored in the CR-VDEV 11C without passing through the Dedup-VDEV 11D and without changing the CPU 211 of a processing entity. In the case of No in S3501, as indicated by a one-dot chain arrow, the Dedup postscript process ends after S3508. The Dedup postscript program 1107 may manage a directory of a hash value of data stored in a block for each block in the Dedup-VDEV 11D and may determine in S3501 whether a hash value matching a hash value of written data is in the directory.

When the determination result of S3501 is positive (Yes in S3501), the Dedup postscript program 1107 causes the CPU determination program 1111 to execute the CPU determination process (S3502). S3502 is executed since the CPU 211 executing the Dedup postscript program 1107 is not likely to match an owner CPU of a target Dedup-VDEV 11D (the Dedup-VDEV 11D which is a storage destination of the duplicated data). Since the CPU 211 executing the Dedup postscript program 1107 does not match the owner CPU of the target Dedup-VDEV 11D, the process is taken over from this CPU 211 to the CPU 211 serving as the owner CPU. That is, S3503 to S3507 are executed by the Dedup postscript program 1107, but the CPU 211 executing the Dedup postscript program 1107 is the CPU 211 same as and also the CPU 211 different from the CPU 211 executing S3501. In other words, the CPU 211 executing S3503 to S3507 is the owner CPU of the Dedup-VDEV 11D of the storage destination of the data.

After S3502, the Dedup postscript program 1107 updates the Dedup allocation management table 1014 (S3503). In S3503, an entry for Dedup allocation information corresponding to data of which a storage destination is the target Dedup-VDEV 11D is added to the Dedup allocation management table 1014.

After S3503, S3508 is executed. Thereafter, the Dedup postscript program 1107 updates the CR-Mapping management table 1012 (S3504). In S3504, an entry for the CR-Mapping-Info corresponding to data of which a storage destination is the Dedup-VDEV 11D is added to the CR-Mapping management table 1012.

The Dedup postscript program 1107 updates the Dir management table 1009 corresponding to the target Dedup-VDEV 11D (S3505). In S3505, CR-Mapping-Info for duplicated data (information indicating a reference destination address in the CR-VDEV 11CC) is associated with an address in the target Dedup-VDEV 11D of the data.

The Dedup postscript program 1107 initializes the CR-Mapping management table 1012 before postscript (S3506). A table of an update target differs between S3504 and S3506. Specifically, in S3504, an entry indicating an address at which data is written from now is the update target. In S3506, an entry indicating an address at which data before update is stored is the update target. Until S3506 is executed, there are two pieces of CR-Mapping-Info. In S3505, a connection destination of Dir-Info is switched from CR-Mapping-Info indicating an old address to CR-Mapping-Info indicating a new address. Thereafter, in S3506, the CR-Mapping-Info indicating the old address is released and the released CR-Mapping-Info enters a state in which the released CR-Mapping-Info is reusable as CR-Mapping-Info of another region.

The Dedup postscript program 1107 invalidates allocation information before update (S3507). The invalidation in S3507 is a process of releasing a VDEV region (a region in a VDEV) to which the data before update is allocated. In S3507, the Dedup postscript program 1107 updates the Dedup allocation management table 1014 and the compression allocation management table 1011. When an allocation destination of the data before update is the Dedup-VDEV 11D, an entry in the Dedup allocation management table 1014 (an entry for the allocation destination of the data before update) is released. When the allocation destination of the data before update is the CR-VDEV 11C, an entry in the data before the update in the compression allocation management table 1011 (an entry for the allocation destination of the data before update) is released and subjected to garbage processing. In S3507, for a region where the number of allocation destinations of the Dedup allocation management table 1014 is 0 (a state (invalid value) in which a value of reference destination allocation information #2402 corresponding to the Dedup-VDEV address 2401 is not registered), a target entry of the compression allocation information is also subjected to garbage processing (the status 2203 of the compression allocation management table 1011 is updated to "2").

Figure 36:
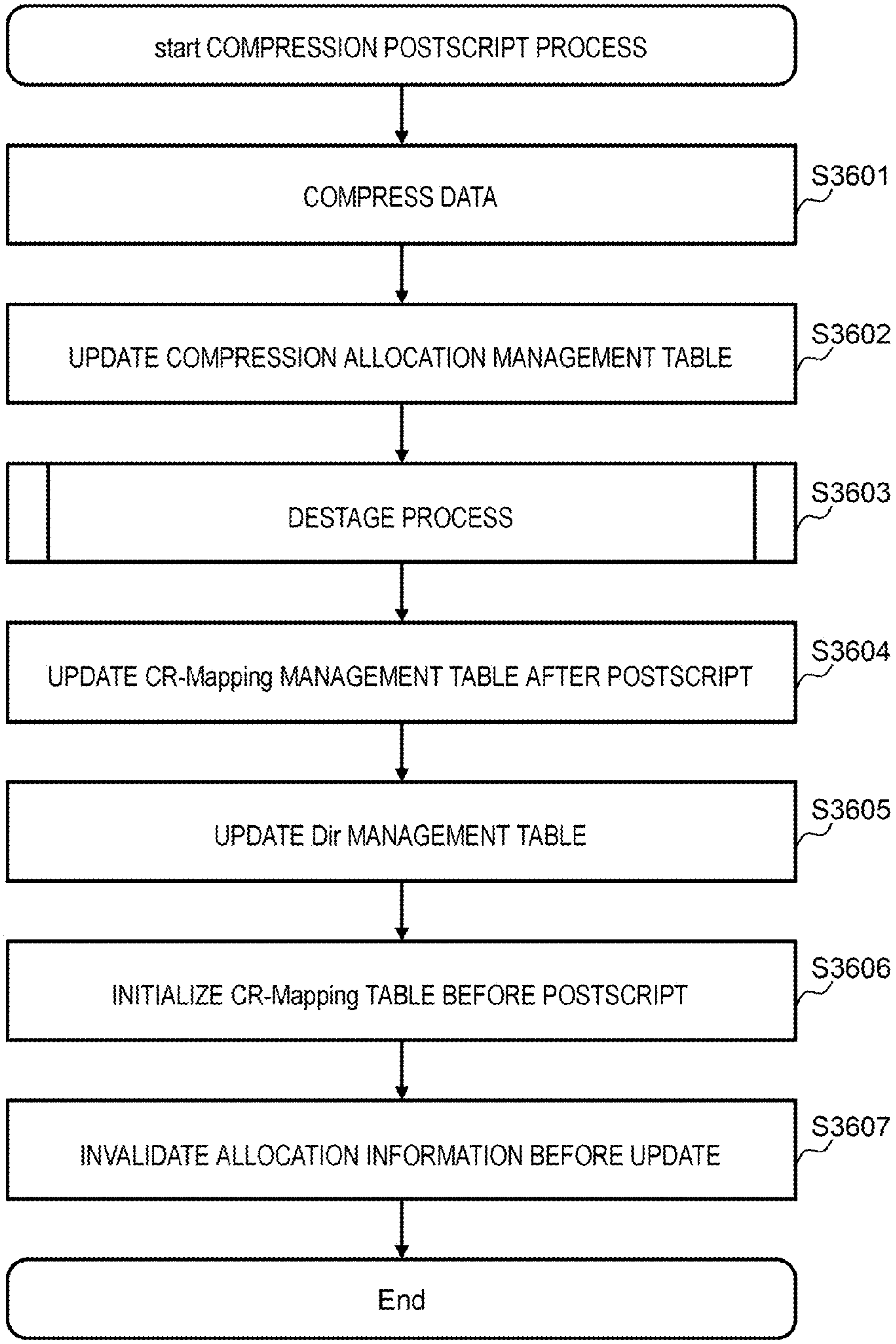
FIG. 36 is a flowchart illustrating a flow of a compression postscript process.

FIG. 36 is a flowchart illustrating a flow of a compression postscript process. The compression postscript process is executed by the compression postscript program 1108 called from the Dedup postscript program 1107.

The compression postscript program 1108 compresses writing target data (S3601). The compression postscript program 1108 updates the compression allocation management table 1011 (S3602). In S3602, for each sub-block in which the number of storage destinations of the compressed data in S3601 is 1 or more, an entry corresponding to the sub-block is updated.

The compression postscript program 1108 causes the destage program 1109 to execute a destage process (S3603).

The compression postscript program 1108 updates the CR-Mapping management table 1012 (S3604). The CR-Mapping management table 1012 has an entry indicating a reference destination of data before update and an entry indicating a reference destination after update. The entry is switched in the Dir management table 1009. In a vacant entry of the CR-Mapping management table 1012, a reference destination address at which the data after update is stored is registered.

The compression postscript program 1108 updates the Dir management table 1009 (S3605). In the case of No in S3501, the Dir management table 1009 corresponding to the SS-VDEV is updated. In the case of Yes in S3501, the Dir management table 1009 corresponding to the Dedup-VDEV is updated.

The compression postscript program 1108 invalidates allocation information before update (S3607). In S3607, the Dedup postscript program 1107 updates the Dedup allocation management table 1014 and the compression allocation management table 1011. The invalidation in S3607 is a process of releasing a region where the data before update is stored and enabling the released region to be allocated when another data is stored. When the data before update is mapped to the Dedup-VDEV 11D, a releasing destination is the Dedup allocation management table 1014. When the data before update is mapped to the CR-VDEV 11C, a releasing destination is the compression allocation management table 1011. In S3607, for a region where the number of allocation destinations of the Dedup allocation management table 1014 is 0 (a state (invalid value) in which a value of reference destination allocation information #2402 corresponding to the Dedup-VDEV address 2401 is not registered), a target entry of the compression allocation information is also subjected to garbage processing (the status 2203 of the compression allocation management table 1011 is updated to "2").

Figure 37:
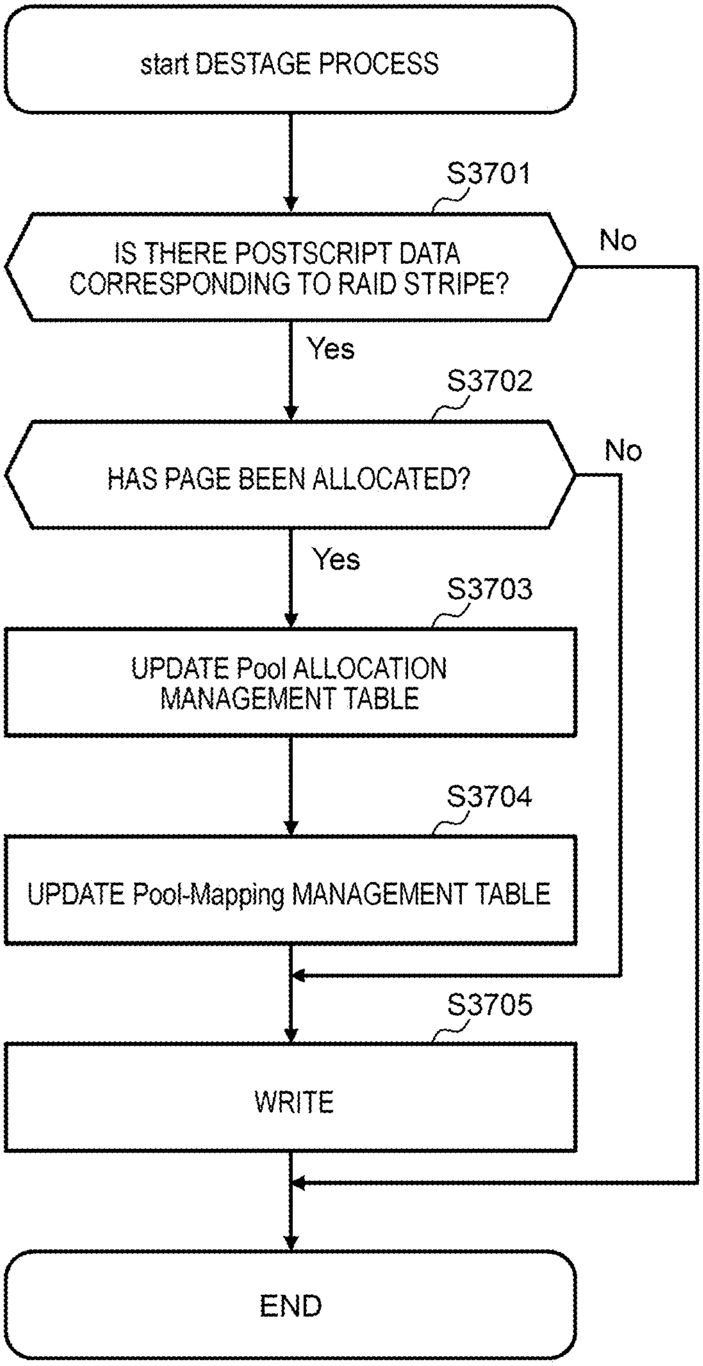
FIG. 37 is a flowchart illustrating a flow of a destage process.

FIG. 37 is a flowchart illustrating a flow of a destage process. The destage process is executed by the destage program 1109 called from the compression postscript program 1108.

The destage program 1109 determines whether postscript data (one or more pieces of compression data) corresponding to a RAID stripe is in the cache unit 903 (S3701). The "RAID stripe" is a stripe in a RAID group (a storage region across a plurality of SSDs 220 included in the RAID group). When a RAID level of the RAID group requires a parity, a size of "postscript data corresponding to the RAID stripe" may be a size obtained by excluding a size of a parity from a size of the stripe. When a determination result of S3701 is negative (No in S3701), the process ends.

When a determination result of S3701 is positive (Yes in S3701), the destage program 1109 determines whether the page 14 has been allocated to a storage destination (an address in the CR-VDEV 11C) of the postscript data corresponding to the RAID stripe with reference to the Pool-Mapping management table 1015 (S3702). When a determination result of S3702 is negative (No in S3702), the process proceeds to S3705.

When a determination result of S3702 is positive (Yes in S3702), the destage program 1109 updates the Pool allocation management table 1016 (S3703). Specifically, the destage program 1109 allocates the page 14. In S3703, entries corresponding to the allocated page 14 (for example, the status 2704, allocation destination VDEV #2705, and the allocation destination address 2706) in the Pool allocation management table 1016 are updated.

The destage program 1109 registers page #2602 of an allocated page in an entry corresponding to a storage destination of the postscript data corresponding to the RAID stripe in the Pool allocation management table 1016 (S3704).

The destage program 1109 writes the postscript data corresponding to the RAID stripe in a stripe which is a basis of a page (S3705). When the RAID level is a RAID level requiring the parity, the destage program 1109 generates the parity based on the postscript data corresponding to the RAID stripe and also writes the parity in the stripe.

Figure 38:
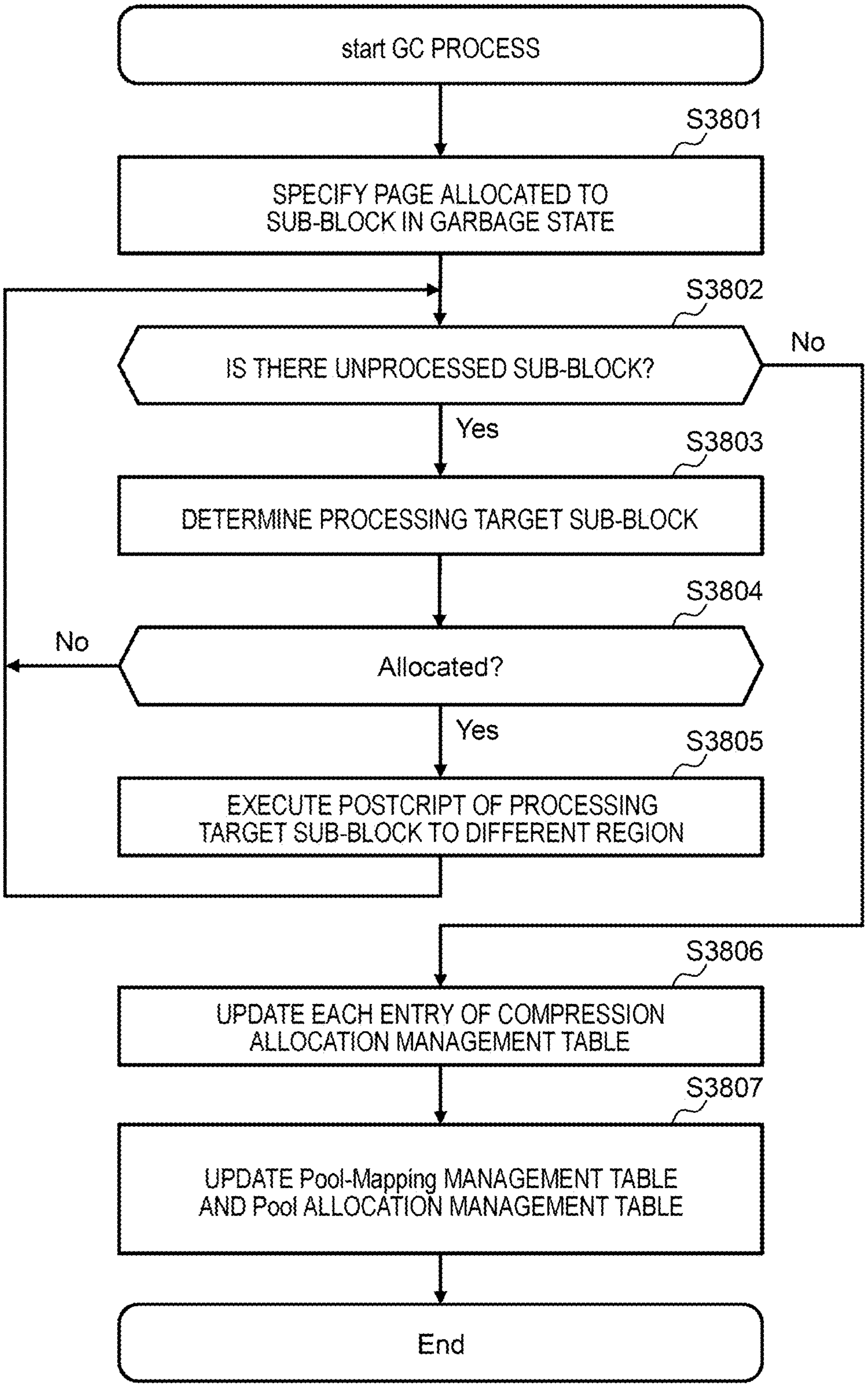
FIG. 38 is a flowchart illustrating a flow of a GC process.

FIG. 38 is a flowchart illustrating a flow of a GC (garbage collection) process. The GC process is executed by the GC program 1110, for example, periodically (or in response to an instruction from the management system 203).

Referring to the Pool-Mapping management table 1015 and the compression allocation management table 1011, the GC program 1110 specifies a page that has a sub-block in a garbage state (status 2203 "2") (S3801). When there is no page that has a sub-block in the garbage state, the GC process may end. In S3801, the GC program 1110 may preferentially select the CR-VDEV 11C in which vacant regions are the smallest among the plurality of CR-VDEVs 11C. In S3801, the GC program 1110 may preferentially specify a page that has the most amount of sub-blocks in the garbage state in the CR-VDEV 11C. The GC may be executed in units of regions different from those of the page 14.

The GC program 1110 determines whether there is an unprocessed sub-block (a sub-block unselected in S3803) in the page specified in S3801 (S3802).

When a determination result of S3802 is positive (Yes in S3802), the GC program 1110 determines a processing target sub-block with reference to the compression allocation management table 1011 (S3803). The GC program 1110 determines whether the status 2203 corresponding to the processing target sub-block is "1" (allocated) (S3804). When a determination result of S3804 is negative (No in S3804), the process returns to S3802. When the determination result of S3804 is positive (Yes in S3804), the GC program 1110 executes a postscript of a processing target sub-block to another region (S3805). "Another region" may be a free sub-block (a sub-block in which the status 2203 is "0") in the CR-VDEV 11C different from the CR-VDEV 11C of the GC processing target (the CR-VDEV 11C that has a sub-block of an allocation destination of the page specified in S3801). The "different CR-VDEV 11C" may be the CR-VDEV 11C in all the sub-blocks are sub-blocks of the flow. The page 14 is allocated to "another region" and compressed data in the processing target sub-block may be written on the page 14 (in other words, the compressed data may be moved to a page allocated to another region from a page allocated to the processing target sub-block).

When the determination result of S3802 is negative (No in S3802), the GC program 1110 updates all the entries of the compression allocation management table 1011 corresponding to the CR-VDEV 11C of the GC processing target (S3806). In S3806, for example, the statuses 2203 of all the entries are "0."

The GC program 1110 updates the Pool-Mapping management table 1015 and the Pool allocation management table 1016 (S3807). In S3806, for example, pages #2602 of all the entries of the Pool-Mapping management table 1015 corresponding to the CR-VDEV 11C of the GC processing target may be initialized, and the status 2704 corresponding to all the pages allocated to the CR-VDEV 11C of the GC processing target is considered to be "0" (free).

In this way, in the GC process according to the embodiment, the plurality of allocated sub-blocks in a discontinuous state enter a continuous state, and therefore effective compressed data between the CR-VDEVs 11C (compressed data in the allocated sub-blocks) may be moved. The plurality of allocated sub-blocks in the discontinuous state enter the continuous state when data is not moved between the CR-VDEVs 11C.

Figure 39:
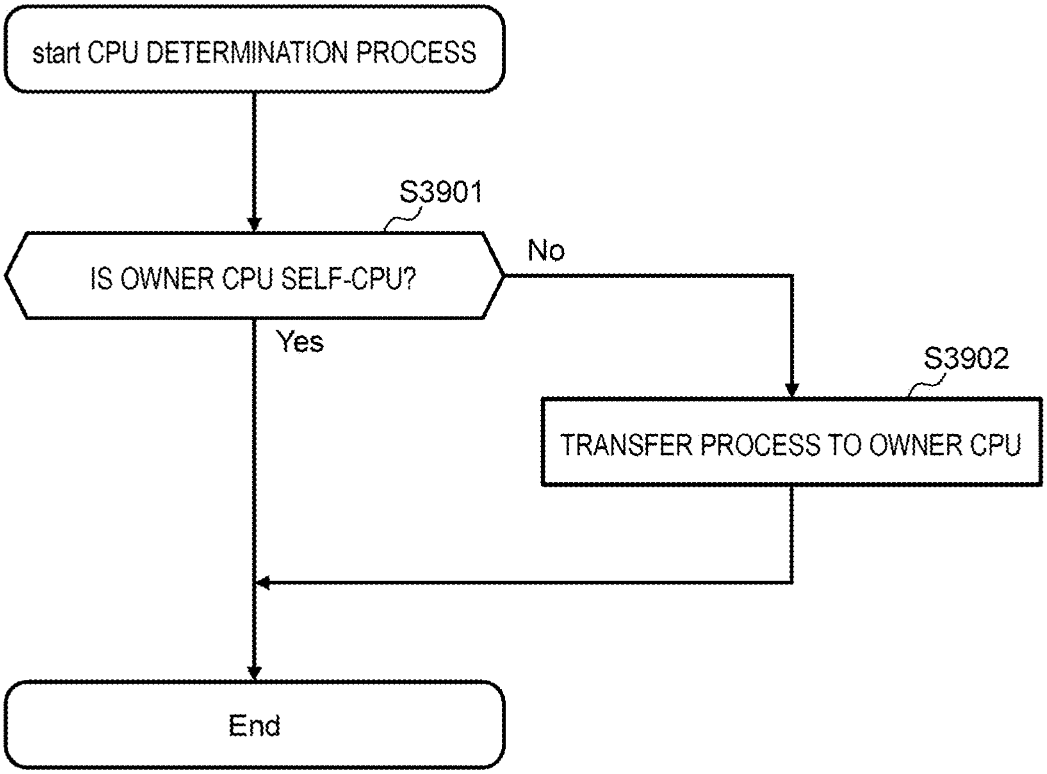
FIG. 39 is a flowchart illustrating a flow of a CPU determination process.

FIG. 39 is a flowchart illustrating a flow of a CPU determination process. The CPU determination process is executed by the CPU determination program 1111 called from the Dedup postscript program 1107.

Referring to the ownership management table 1001, the CPU determination program 1111 determines whether the owner CPU of the processing target Dedup-VDEV 11D is the self-CPU 211 (the CPU 211 executing the determination of S3501) (S3901).

When a determination result of S3901 is negative (No in S3901), the CPU determination program 1111 transfers a process of the self-CPU to the owner CPU (S3902). Accordingly, the owner CPU takes over the process. As a result, the CPU executing the process after S3503 of FIG. 35 becomes the owner CPU (the CPU of a destination taking over the process) of the Dedup-VDEV 11D.

The CPU determination process may also be executed in a process other than the Dedup postscript process illustrated in FIG. 35. In the embodiment, in the process from the VOL 10 to the CR-VDEV 11C, the CPU determination process may be executed only when the owner CPU is different, specifically, only when the Dedup-VDEV 11D is a write destination. In other words, when the write destinations are the VOL 10, the SS-VDEV 11S, and the CR-VDEV 11C, the owner CPUs are the same. Therefore, the CPU determination process may not be executed. Accordingly, an improvement in performance of the write process is expected.

Figure 40:
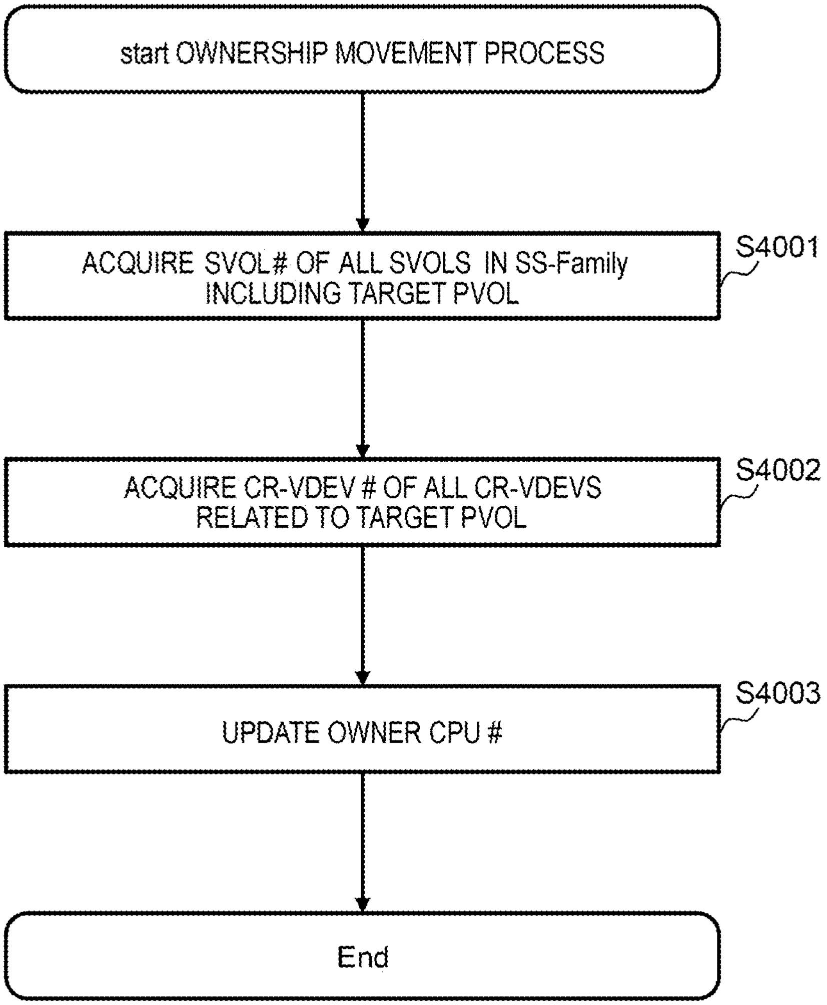
FIG. 40 is a flowchart illustrating a flow of an ownership movement process.

FIG. 40 is a flowchart illustrating a flow of an ownership movement process. The ownership movement process is executed by the ownership movement program 1112, for example, in a response to an instruction from the management system 203 or when a failure occurs in the CPU 211. The CPU 211 executing the ownership movement program 1112 may be any normal CPU 211 or may be the CPU 211 of which a load is the lowest.

The ownership movement program 1112 acquires all SVOLs #1402 in the target SS-Family 9 from the snapshot management table 1003 (S4001). The "target SS-Family 9" is the SS-Family 9 that includes the target PVOL 10P. The "target PVOL 10P" may be the PVOL 10P designated from the management system 203 or may be the PVOL 10P in which the CPU 211 in which a failure has occurred is an owner CPU.

Referring to the Dir management table 1009, the CR-VDEV management table 1002, and the CR-Mapping management table 1012, the ownership movement program 1112 acquires CR-VDEV #1302 of all the CR-VDEVs 11C related to the target PVOL 10P (S4002). The "CR-VDEVs 11C related to the target PVOL 10P" is the CR-VDEV 11C in which an allocation destination is the SS-VDEV 11S of the target SS-Family 9.

The ownership movement program 1112 updates the owner CPUs #1202 of the SVOL 10S of SVOL # acquired in S4001, the CR-VDEV 11C of CR-VDEV # acquired in S4002, and the SS-VDEV 11S of the target SS-Family 9 and the target PVOL 10P (S4003). The owner CPUs #1202 after the update are the same identification number. That is, ownerships of the SVOL 10S of SVOL # acquired in S4001, the CR-VDEV 11C of CR-VDEV # acquired in S4002, and the SS-VDEV 11S of the target SS-Family 9 and the target PVOL 10P have the same CPU.

Second Embodiment

A second embodiment will be described. At this time, different points from the first embodiment will be mainly described and description of common points to the first embodiment will be omitted or simplified.

In the second embodiment, an SVOL 10S may be a write-permitted snapshot. Hereinafter, the write-permitted SVOL (snapshot) is abbreviated to a writable SVOL and referred to as a "WR-SVOL" and a read-only SVOL (snapshot) is referred to as an "RO-SVOL."

Figure 41:
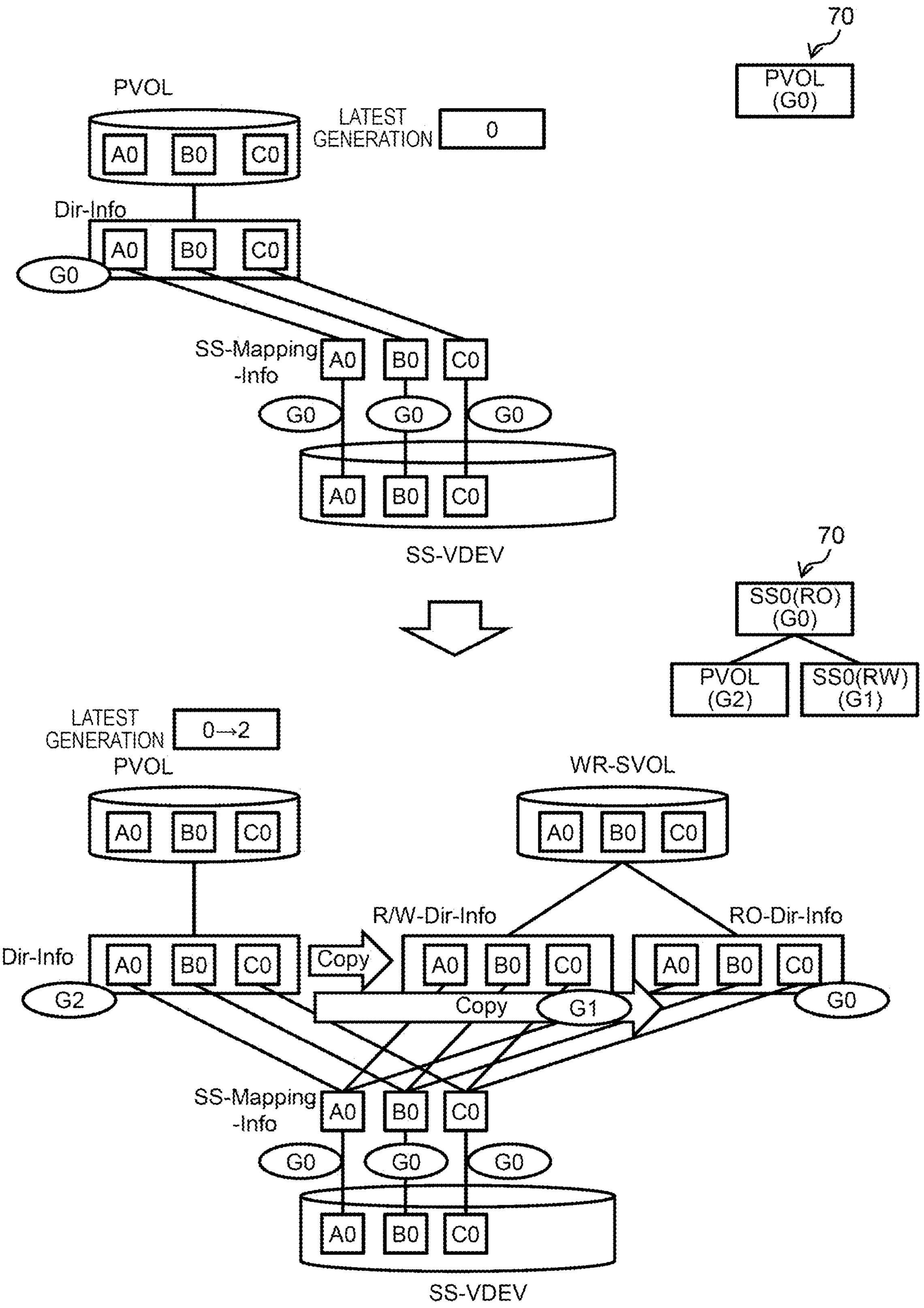
FIG. 41 is a diagram illustrating an overview of acquisition of a WR-SVOL according to a second embodiment.

FIG. 41 is a diagram illustrating an overview of acquisition of a WR-SVOL.

When a WR-SVOL is produced, a processor prepares RO-Dir-Info and R/W-Dir-Info for the WR-SVOL. The RO-Dir-Info is write-prohibited (read-only) Dir-Info. The R/W-Dir-Info is write-permitted (read/write) Dir-Info.

The processor sets latest generation # (generation # indicated by the latest generation table 1005) before production of a snapshot to generation # of RO-Dir-Info and sets generation # obtained by increasing generation # of the RO-Dir-Info to generation # of R/W-Dir-Info. The processor sets generation # obtained by increasing generation # of R/W-Dir-Info to latest generation # and generation # of Dir-Info of a PVOL.

In the example illustrated in FIG. 41, latest generation # before production of a snapshot is "0." Therefore, generation # of the RO-Dir-Info is "0," generation # of the R/W-Dir-Info is "1," and latest generation # and generation # of the PVOL of Dir-Info after production of the snapshot are each "2."

Also, as the Dir-Info generation management tree 70, an RO-SVOL (read-only SVOL) corresponding to generation 0 is a parent and an RW-SVOL corresponding to generation 1 and a PVOL of generation 2 are children.

Figure 42:
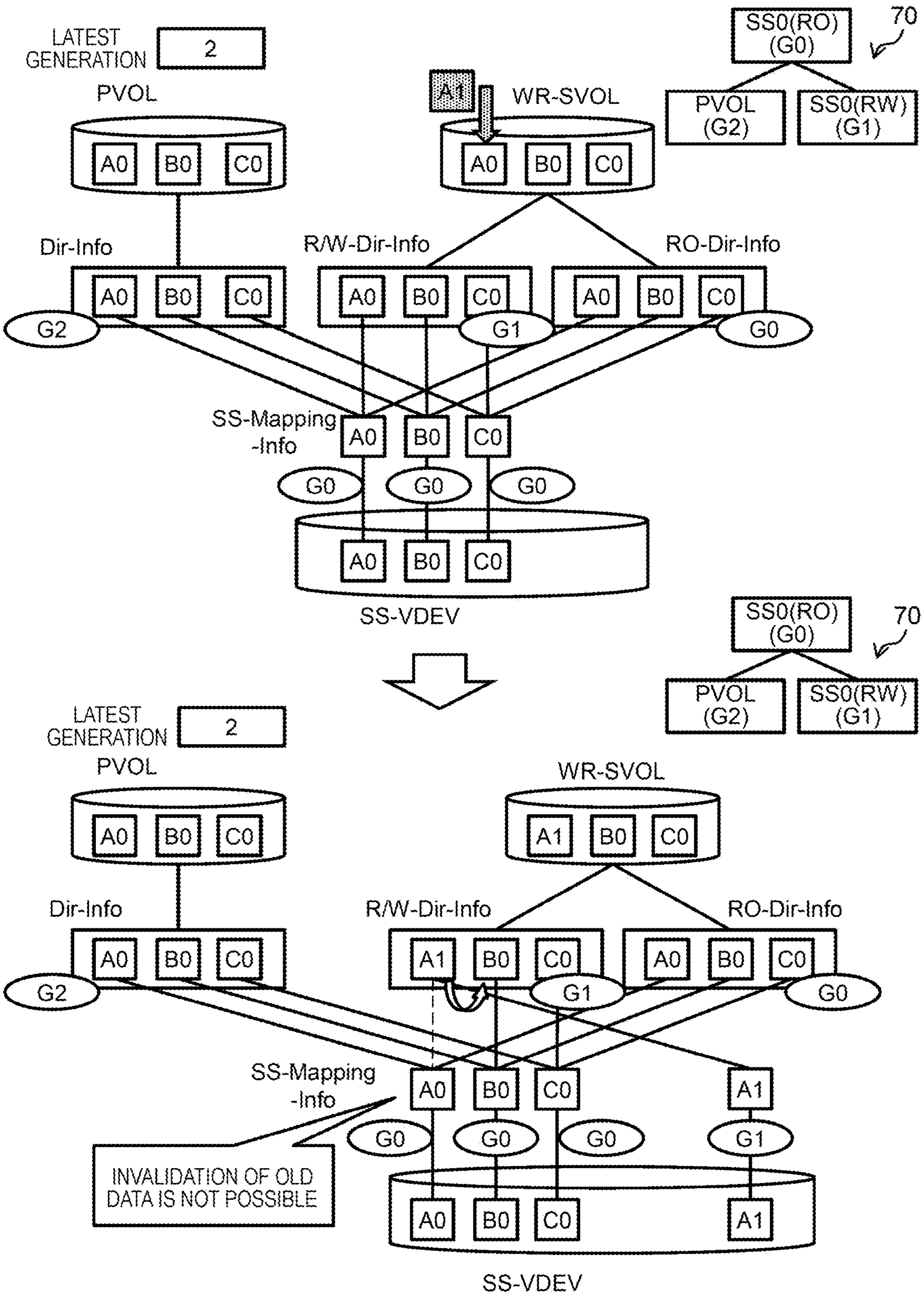
FIG. 42 is a diagram illustrating an overview of writing on the WR-SVOL.

FIG. 42 is a diagram illustrating an overview of writing on the WR-SVOL.

When data A0 in the WR-SVOL is rewritten to data A1, the processor guarantees a new region of an SS-VDEV, and the region is set as a storage destination of the data A1. For the new data A1 in the SS-VDEV, the processor generates new SS-Mapping-Info and associates generation information indicating generation # of the WR-SVOL with the SS-Mapping-Info of the data A1. Therefore, generation # of the SS-Mapping-Info of the data A1 is "1."

The processor associates an address of a write destination in the PVOL with the writing target data A1 by switching a reference relationship (correspondent relationship) between the Dir-Info and the SS-Mapping-Info of generation 1.

For the SS-Mapping-Info of the data A0, reference from generation 1 is released by switching the reference destination. However, the SS-Mapping-Info of the data A0 remains referred to from the RO-Dir-Info (generation 0) of the WR-SVOL. Therefore, invalidation of the SS-Mapping-Info of the data A0 is not executed.

The processor determines whether to execute the invalidation. This determination includes comparing generation # determination target Mapping-Info for determining whether to execute the invalidation with generation # of the R/W-Dir-Info of a write destination VOL (here, the WR-SVOL). The processor determines that the invalidation can be executed when the generations # match each other. On the other hand, when generation # of the Mapping-Info is old, the processor determines that the invalidation cannot be executed.

Figure 43:
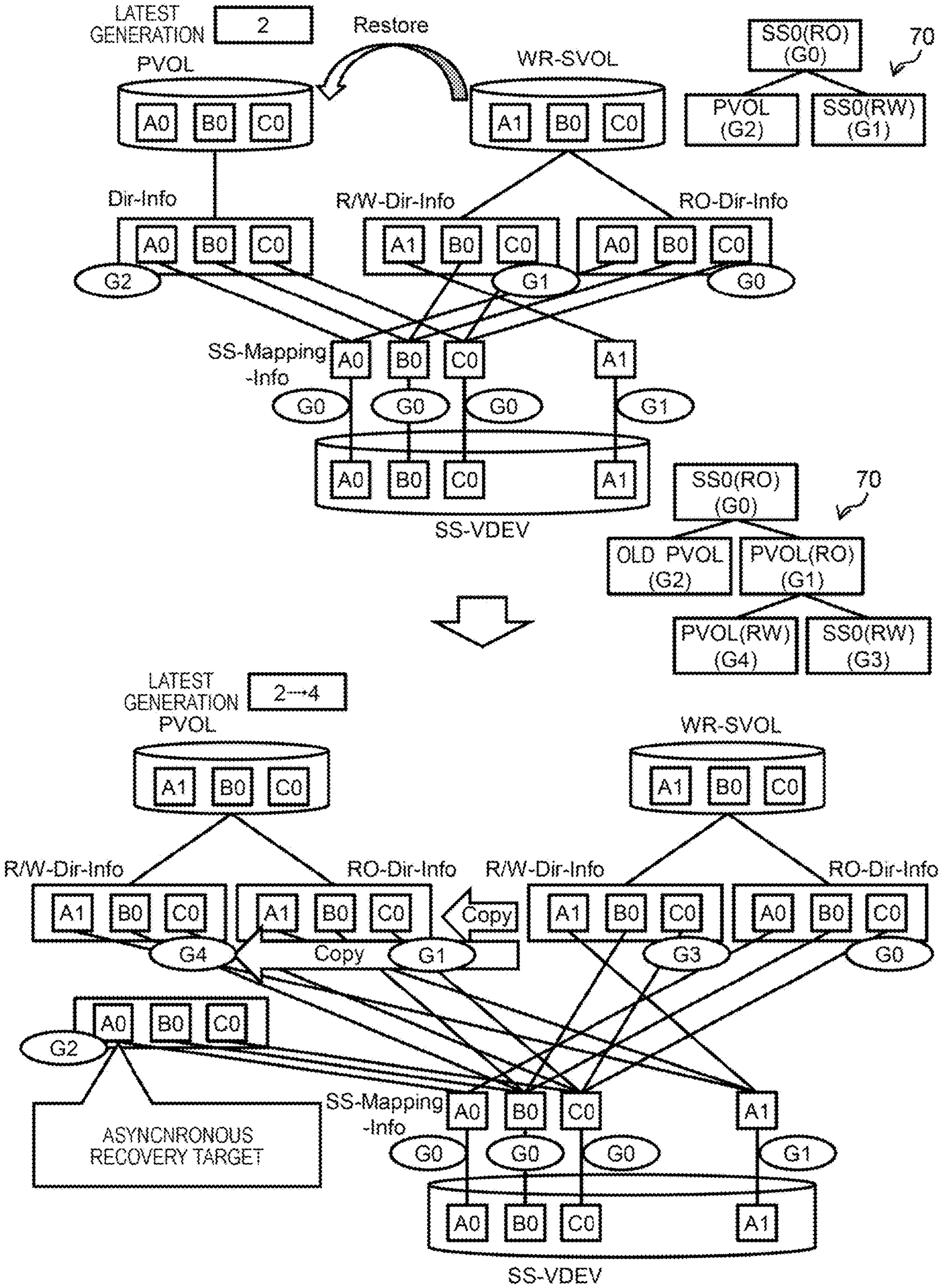
FIG. 43 is a diagram illustrating an overview of restoration from the WR-SVOL.

FIG. 43 is a diagram illustrating an overview of restoration from the WR-SVOL.

When restoration from the WR-SVOL to the PVOL (for example, the PVOL of generation 2) is executed, the processor newly produces RO-Dir-Info and R/W-Dir-Info for a PVOL of the restoration destination. Both the RO-Dir-Info and the R/W-Dir-Info are copies of R/W-Dir-Info of the WR-SVOL.

Generation # of the new RO-Dir-Info is the same generation # as generation # of the R/W-Dir-Info of the WR-SVOL of a restoration source. On the other hand, generation # of the new R/W-Dir-Info is generation # obtained by increasing generation # of the PVOL of the restoration destination by two generations. Generation # of the R/W-Dir-Info of the WR-SVOL of the restoration source is generation # obtained by increasing source generation # by two generations.

As a result, as exemplified in FIG. 43, latest generation # is "4" as a result obtained by increasing generation # of the PVOL of the restoration destination by two generations.

Generation # of the RO-Dir-Info of the restoration source is "0." Generation # of the RO-Dir-Info of the restoration destination is "1," generation # of the old Dir-Info of the restoration destination is "2," both of which are children of generation # of "0."

Generation # of the R/W-Dir-Info of the restoration source is "3," generation # of the R/W-Dir-Info of the restoration destination is "4," both of which are children of generation # of "1."

Through the restoration, the old Dir-Info of generation 2 becomes an asynchronous recovery target in which a correspondent relationship with the PVOL is released and a reference from the PVOL or the SVOL (snapshot) is lost. That is, the processor invalidates the Dir-Info of generation 2. The processor specifies generation # "2" as an invalidation target generation.

Several embodiments have been described above, but the embodiments are exemplified to describe the invention and the range of the invention is not limited to only these embodiments. The invention can also be implemented in various other forms.

The above description can be summarized as follows, for example. The following summarization may include supplementary description of the above description or description of modified examples.

In the storage system 201 including a storage device and a processor, the storage device stores first mapping information and second mapping information.

For each SS-Family 9, the first mapping information includes information indicating mapping between addresses of the VOL 10 in the SS-Family 9 and addresses in the SS-VDEV 11S. For example, the first mapping information includes Dir-Info (an example of first control information) of each VOL 10 and SS-Mapping-Info (an example of second control information) of each piece of data in the SS-VDEV 11S. The Dir-Info of each VOL is associated with generation # of the VOL and indicates which SS-Mapping-Info is referred to at an address in the VOL. The SS-Mapping-Info of each piece of data is associated with oldest generation # among generation # of Dir-Info referring to the SS-Mapping-Info and indicates an address at which there is the data in the SS-VDEV 11S.

The second mapping information includes information indicating mapping between addresses in the SS-VDEV 11S and addresses in the Dedup-VDEV 10D. For example, the second mapping information includes Dir-Info (an example of third control information) prepared for each of the SS-VDEV 11S0 and the Dedup-VDEV 11D and CR-Mapping-Info (an example of fourth control information) associated 1:1 with data in which the SS-VDEV 11S or the Dedup-VDEV 10D is considered as a storage destination.

For each of the plurality of SS-Families 9, there are one or more SS-VDEVs 11S. Each SS-VDEV 11S is a logical address space (virtual device) serving as a storage destination of data of the VOL 10 in the SS-Family 9 corresponding to the SS-VDEV 11S. The Dedup-VDEV 10D is a logical address space (virtual device) different from the SS-VDEV 11S.

When there is the same data in the plurality of VOLs 10 of the SS-Family 9, the processor updates the first mapping information so that a plurality of addresses in the same data in the plurality of VOLs 10 are mapped to the addresses of the SS-VDEV 11S of the SS-Family 9. When there is duplicated data in two or more SS-VDEVs 11S of two or more SS-Families 9, the processor updates the second mapping information so that two or more addresses of the duplicated data in the two or more SS-VDEVs 11S are mapped to addresses corresponding to the duplicated data among the Dedup-VDEVs 10D.

Accordingly, even when the addresses of the duplicated data are changed, the address mapping can be changed in a short time.

The second mapping information may further include the following information:

- a pair of Dir-Info of the SS-VDEV 11S and CR-Mapping-Info which is referred to from the Dir-Info and refers to an address in the CR-VDEV 11C (an example of a postscript virtual device): this pair is an example of the information indicating mapping between addresses in the SS-VDEV 11S and addresses in the CR-VDEV 11C; and
- a pair of Dir-Info of the Dedup-VDEV 10D and CR-Mapping-Info which is referred to from the Dir-Info and refers to an address in the CR-VDEV 11C: this pair is an example of the information indicating mapping between addresses in the Dedup-VDEV 10D and addresses in the CR-VDEV 11C.

Each CR-VDEV 11C may be a logical address space (virtual device) corresponding to one of the SS-VDEV 11S and the Dedup-VDEV 10D. Each CR-VDEV 11C may serve as a storage destination of data in which a virtual device corresponding to the CR-VDEV 11C is a storage destination and may not serve as a storage destination of data in which a virtual device not corresponding to the CR-VDEV 11C is a storage destination The processor may store data in which the CR-VDEV 11C is a storage destination in the pool 13. The pool 13 may be a logical address space based on at least one of at least a part of the storage device of the storage system 201 and at least a part of an external device of the storage system 201. When a storage target for the CR-VDEV 11C is updated data, the processor may set a storage destination of the updated data to a vacant address in the CR-VDEV 11C, invalidate an address of data before update of the updated data, and update the second mapping information so that addresses in the SS-VDEV 11S or the Dedup-VDEV 10D which are addresses mapped to the addresses of the data before update are mapped to storage destination addresses of the updated data in the CR-VDEV 11C.

The mapping between the addresses in the CR-VDEV 11C and the addresses in the pool 13 may be 1:1.

Accordingly, even when the address of compressed data of duplicated data in the CR-VDEV 11C is changed (for example, an address is changed in the GC process), the address mapping can be changed in a short time.

The processor may be a plurality of CPUs 211 (examples of a plurality of processors). When the CPU 211 corresponds to an owner CPU of a VOL or a VDEV, each CPU 211 may execute updating of information regarding I/O for the VOL or the VDEV or address mapping for the VOL or the VDEV in the first mapping information and the second mapping information. The owner CPU of the SS-Family 9, the owner CPU of the SS-VDEV 11S for the SS-Family 9, and the owner CPU of the CR-VDEV 11C corresponding to the SS-VDEV 11S may be the same CPU 211. Accordingly, in a write process for deduplicated data, the owner CPUs are consistently the same CPU. Therefore, movement of an ownership between the CPUs 211 (communication for taking over a process between the CPUs 211) is not necessary.

The owner CPU of the Dedup-VDEV 10D and the owner CPU of the CR-VDEV 11CC corresponding to the Dedup-VDEV 10D may be the same CPU 211. Accordingly, in writing on the Dedup-VDEV 10D and the CR-VDEV 11CC corresponding to the Dedup-VDEV 10D, movement of an ownership between the CPUs 211 is not necessary.

When the Dedup-VDEV 10D is a write destination, each CPU 211 may execute CPU determination of whether the CPU 211 corresponds to the owner CPU of the Dedup-VDEV 10D. In other words, when the Dedup-VDEV 10D is not a write destination, the CPU 211 may not execute the CPU determination. Accordingly, an improvement in processing performance is expected.

When conditions (a) and (b) below are satisfied in a write request process of designating one PVOL 10P, the processor may execute a process (for example, writing on the CR-VDEV 11C associated with the SS-VDEV 11S of the SS-Family 9 including the PVOL 10P or writing on the Dedup-VDEV 10D) in the snapshot postscript process:

(a) a cache region corresponding to an address designated with the write request is in the cache unit 903 and data of the cache region is dirty data which is data not reflected in the pool 13, and (b) a generation of the dirty data is different from a latest generation of the PVOL 10P.

For each SS-Family 9, the processor may determine whether to invalidate the Dir-Info and/or the SS-Mapping-Info based on the generation of the Dir-info and the generation of the SS-Mapping-Info asynchronously with the process of the I/O request of the VOL in the SS-Family 9 and may invalidate the Dir-Info and/or the SS-Mapping-Info for which the invalidation is possible. Even when there is no meta-information (for example, reference information from the pool 13 to the VOL 10) of a reverse reference system, it is possible to determine whether to execute the invalidation efficiently.

The processor may invalidate the SS-Mapping-Info referred to by the Dir-Info of a target when conditions (x) and (y) below are satisfied:

(x) a generation of the SS-Mapping-Info referred to by the Dir-Info of a generation immediately newer than the Dir-Info of the target does not match a generation of the SS-Mapping-Info referred to by the Dir-Info of the target, and (y) a generation of the Dir-Info immediately older than the Dir-Info of the target is older than a generation of the SS-Mapping-Info referred to by the Dir-Info of the target.

When a WR SVOL is produced, the processor may produce the RO-Dir-Info and the R/W-Dir-Info for the SVOL, set the latest generation before production of the SVOL to the generation of the RO-Dir-Info, and set a generation obtained by increasing the generation of the RO-Dir-Info as a generation of the R/W-Dir-Info.

The processor may compare the generation of the SS-Mapping-Info with the generation of the R/W-Dir-Info of the WR-SVOL. The processor may invalidate the SS-Mapping-Info when the generation of the SS-Mapping-Info matches the generation of the R/W-Dir-Info. The processor may not invalidate the SS-Mapping-Info when the generation of the SS-Mapping-Info is older than the generation of the R/W-Dir-Info.

When restoration from the WR-SVOL to the PVOL is executed, the processor may produce the RO-Dir-Info and the R/W-Dir-Info for a PVOL of a restoration destination as a copy of the R/W-Dir-Info of the WR-SVOL. At this time, the processor may set the generation of the RO-Dir-Info for the PVOL of the restoration destination to the generation of the R/W-Dir-Info of the WR-SVOL, may set the generation of the R/W-Dir-Info for the PVOL of the restoration destination to a generation which is newer by two generations than the generation of the PVOL of the restoration destination, and may set the generation of the R/W-Dir-Info for the WR-SVOL to a generation which is newer by two generations from an original generation of the R/W-Dir-Info. The processor may invalidate the Dir-Info when the original Dir-Info of the PVOL of the restoration destination is not referred to from either the PVOL and the SVOL.

When the generation of the Dir-Info which is an invalidation target is specified as a target generation, the processor may determine whether to execute invalidation based on a reference state in a generation immediately older in a lineage of a target generation and a reference state in a generation immediately newer in the lineage of the target generation. Accordingly, it is possible to determine whether to execute the invalidation without seeing all the generations.

When the SVOL 10S is produced, the processor increases the latest generation by one generation using the latest generation before production of the SVOL 10S as a generation of the SVOL 10S. When the restoration is executed from the SVOL 10S to one PVOL 10P as well, the processor may increase the latest generation.

When writing on the PVOL 10P is executed, the processor associates an address of a writing destination in the PVOL 10P with writing target data, associates a generation of the PVOL 10P with the SS-Mapping-Info, and sets the SS-Mapping-Info in which the correspondent relation with the Dir-Info is released through switching of the correspondent relation as an invalidation target by setting a new region of the SS-VDEV 11S as a storage destination of writing target data and switching a correspondent relationship between the Dir-Info and the SS-Mapping-Info. When the generation of the SS-Mapping-Info which becomes the invalidation target matches the generation related to the Dir-Info of the PVOL 10P, the processor may determine that the invalidation is possible. Accordingly, it is possible to determine that the existing stored data is invalidated using a write process as an opportunity and it is possible to determine whether to execute the invalidation efficiently. When the SS-Mapping-Info is invalidated, the processor may invalidate data referred to from the SS-Mapping-Info.

When the restoration is executed from the SVOL 10S to the PVOL 10P, the processor may associate a copy of the Dir-Info of the SVOL 10S of a restoration source with the PVOL 10P, increase the latest generation, and specify a generation of the Dir-Info associated with the PVOL 10P before the restoration as an invalidation target generation. When a generation associated with the SS-Mapping-Info is newer than that of the SS-Mapping-Info associated with the Dir-Info of the target generation in comparison with a generation immediately older in a lineage of the target generation and is not referred to from a generation immediately newer in the lineage of the target generation, the processor may determine that the invalidation is possible.

When the SVOL 10S is deleted, the processor may specify a generation associated with the Dir-Info of the deleted SVOL 10S as an invalidation target generation. When a generation associated with the SS-Mapping-Info is newer than the SS-Mapping-Info associated with the Dir-Info of the target generation in comparison with a generation immediately older in the lineage of the target generation and is not referred to from a generation immediately newer in the lineage of the target generation, the processor may determine that the invalidation is possible.

What is claimed is:

1. A storage system comprising:

a storage device and a processor, wherein the storage device stores first mapping information and second mapping information, wherein the first mapping information includes information indicating mapping, between an address of a respective volume (VOL) in a respective snapshot family and an address in a respective snapshot virtual device, in each of a plurality of snapshot families each including a primary volume (PVOL) and a secondary volume (SVOL) which is a snapshot of the PVOL, wherein the second mapping information includes information indicating mapping between an address in the respective snapshot virtual device and an address in a deduplication virtual device, wherein the processor:

i) updates the first mapping information by making a first address be subjected to release, wherein the first address, in one of the respective snapshot virtual devices, is not mapped to a second address in one of the respective volumes in one of the respective snapshot families; and ii) updates the second mapping information by making a third address be subjected to release, wherein the third address, in the deduplication virtual device, is not mapped to the first address.

2. The storage system according to claim 1, wherein the processor, in release, releases a region in a postscript virtual device which is mapped with the first address and the third address, and wherein the postscript virtual device has an address which is mapped with an address in one of the respective snapshot virtual devices or the deduplication virtual devices.

3. The storage system according to claim 1, wherein one or more snapshot virtual devices are provided for each of the plurality of snapshot families, wherein the respective snapshot virtual device is a virtual device which is a logical address space serving as a storage destination of data of the respective VOL, in the respective snapshot family, corresponding to the respective snapshot virtual device, wherein the deduplication virtual device is a virtual device which is a logical address space different from the respective snapshot virtual device, wherein, when there is same data in a plurality of VOLs of the respective snapshot family, the processor updates the first mapping information so that a plurality of addresses of the same data in the plurality of VOLs are mapped to addresses of the respective snapshot virtual device of the respective snapshot family, and wherein, when there is duplicated data in two or more of the respective snapshot virtual devices of two or more of the respective snapshot families, the processor updates the second mapping information so that two or more addresses of the duplicated data of the two or more of the respective snapshot virtual devices are mapped to addresses, corresponding to the duplicated data, in the deduplication virtual device.

4. The storage system according to claim 1, wherein the second mapping information further includes information indicating mapping between an address in the respective snapshot virtual device and an address in a plurality of postscript virtual devices, and information indicating mapping between an address in the deduplication virtual device and an address in the plurality of postscript virtual devices, wherein each of the plurality of postscript virtual devices is a virtual device that is a logical address space corresponding to one of i) the respective snapshot virtual device and ii) the deduplication virtual device, wherein each postscript virtual device, of the plurality of postscript virtual devices, i) serves as a storage destination of a data in which a virtual device, corresponding to the postscript virtual device, is a storage destination and ii) does not serve as a storage destination of data in which a virtual device, not corresponding to the postscript virtual device, is a storage destination, wherein the processor stores data, in which one or more of the plurality of postscript virtual devices is a storage destination, in a pool, wherein the pool is a logical address space based on at least one of i) at least a part of the storage device and ii) at least a part of an external device of the storage system, wherein, when a first postscript virtual device of the plurality of postscript virtual devices is target storage of updated data, the processor sets a storage destination of the updated data to a vacant address in the first postscript virtual device, invalidates an address of data before update of the updated data, and updates the second mapping information so that an address, i) in the respective snapshot virtual device or the deduplication virtual device and ii) mapped to the address of the data before the update of the updated data, is mapped to the storage destination address of the updated data in the postscript virtual device, and wherein mapping between an address in the plurality of postscript virtual devices and an address in the pool is 1:1.

5. A storage system comprising:

a storage device and a processor, wherein the storage device stores first mapping information and second mapping information, wherein the first mapping information includes information indicating mapping, between an address of a respective volume (VOL) in a respective snapshot family and an address in a respective snapshot virtual device, in each of a plurality of snapshot families each including a primary volume (PVOL) and a secondary volume (SVOL) which is a snapshot of the PVOL, wherein the second mapping information includes information indicating mapping between an address in the respective snapshot virtual device and an address in a deduplication virtual device, wherein the processor is a plurality of processor devices, wherein each processor device of the plurality of processor devices executes processing on a VOL or a virtual device in which the processor device is respective owner of the VOL or the virtual device, wherein an owner processor device of one of the respective snapshot families, an owner processor device of one of the respective snapshot virtual devices for the one of the respective snapshot families, and an owner processor device of one of a plurality of postscript virtual devices corresponding to the one of the respective snapshot virtual devices are same processor device, wherein a postscript virtual device has an address which is mapped with an address in:

i) one of the respective snapshot virtual devices; or ii) the deduplication virtual device, and wherein an owner processor device of the deduplication virtual device and one of the plurality of postscript virtual devices corresponding to the deduplication virtual device are same processor device.

6. The storage system according to claim 5, wherein there are a plurality of snapshot virtual devices, wherein each of the plurality of processor devices become an owner processor device, wherein there are a plurality of deduplication virtual devices, and wherein a plurality of owner processor devices of the snapshot families and the snapshot virtual devices are owner processor devices of the plurality of deduplication virtual devices.

7. The storage system according to claim 1, wherein the storage device includes a cache unit that temporarily stores data, wherein, when conditions (a) and (b) below are satisfied in a process for a write request for designating one PVOL, the processor executes i) writing on a postscript virtual device associated with a snapshot virtual device of a snapshot family including the one PVOL or ii) writing on the deduplication virtual device:

(a) a cache region, corresponding to an address designated with the write request, is in the cache unit, and data of the cache region is dirty data which is data not reflected in a pool, and (b) a generation of the dirty data is different from a latest generation of the PVOL.

8. The storage system according to claim 1, wherein the first mapping information includes i) first control information of each VOL in the plurality of snapshot families and ii) second control information associated with data in the respective snapshot virtual device in each of the plurality of snapshot families, wherein the first control information of each of the VOL is associated with a generation of the VOL and indicates which second control information is referred to at an address in the VOL, wherein the second control information i) is associated with an oldest generation of the first control information referring to the second control information and ii) indicates a certain address of the data in the respective snapshot virtual device, and wherein, for each snapshot family, the processor determines whether to invalidate the first control information and/or the second control information asynchronously with a process for an I/O request of the VOL in the respective snapshot family and invalidates the first and/or second control information for which the invalidation is possible, based on a generation of the first control information and a generation of the second control information.

9. A storage control method of a storage system, the storage control method comprising:

preparing first mapping information and second mapping information, wherein the first mapping information includes information indicating mapping, between an address of a respective volume (VOL) in a respective snapshot family and an address in a respective snapshot virtual device, in each of a plurality of snapshot families each including a primary volume (PVOL) and a secondary volume (SVOL) which is a snapshot of the PVOL, and wherein the second mapping information includes information indicating mapping between an address in the respective snapshot virtual device and an address in a deduplication virtual device;

updating the first mapping information by making a first address be subjected to release, wherein the first address, in the one of the respective snapshot virtual devices, is not mapped to a second address in one of the respective volumes in one of the respective snapshot families; and updating the second mapping information by making a third address be subjected to release, wherein the third address, in the deduplication virtual device, is not mapped to the first address.

10. A storage control method of a storage system, the storage control method comprising:

preparing first mapping information and second mapping information, wherein the first mapping information includes information indicating mapping, between an address of a respective volume (VOL) in a respective snapshot family and an address in a respective snapshot virtual device, in each of a plurality of snapshot families each including a primary volume (PVOL) and a secondary volume (SVOL) which is a snapshot of the PVOL, and wherein the second mapping information includes information indicating mapping between an address in the respective snapshot virtual device and an address in a deduplication virtual device; and executing, by each processor device of a plurality of processor devices, processing on a VOL or a virtual device in which the processor device is respective owner of the VOL or the virtual device, wherein an owner processor device of one of the respective snapshot families, an owner processor device of one of the respective snapshot virtual devices for the one of the respective snapshot families, and an owner processor device of one of a plurality of postscript virtual devices corresponding to the one of the respective snapshot virtual devices are same processor device, wherein a postscript virtual device has an address which is mapped with an address in:

i) one of the respective snapshot virtual devices; or ii) the deduplication virtual device, and wherein an owner processor device of the deduplication virtual device and one of the plurality of postscript virtual devices corresponding to the deduplication virtual device are same processor device.

* * * * *